US012768273B2

(12) United States Patent
Krasnoff

(10) Patent No.: US 12,768,273 B2
(45) **Date of Patent: *Oct. 20, 2026**

(54) ROTATIONAL ENGINE WITH A ROTATING COMBUSTION CHAMBER WITH A COMPRESSION MECHANISM COUPLED TO A PISTON

(71) Applicant: Duplicent, LLC, Santa Monica, CA (US)

(72) Inventor: Curren Emmett Krasnoff, Santa Monica, CA (US)

(73) Assignee: DUPLICENT, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/928,999

(22) Filed: Oct. 28, 2024

(65) Prior Publication Data

US 2025/0290419 A1 Sep. 18, 2025

Related U.S. Application Data

(63) Continuation of application No. 18/606,759, filed on Mar. 15, 2024, now abandoned, which is a (Continued)

(51) Int. Cl.

*F01C 1/077* (2006.01)
*F01B 5/00* (2006.01)

(Continued)

(52) U.S. Cl.

CPC .............. *F01C 1/077* (2013.01); *F01B 5/003* (2013.01); *F02B 53/00* (2013.01); *F02B 53/02* (2013.01);

(Continued)

(58) Field of Classification Search

CPC .......... F02B 53/02; F02B 53/10; F02B 55/12; F02B 53/00; F02B 53/12; F02B 55/02;

(Continued)

(56) References Cited

U.S. PATENT DOCUMENTS 656,483 A 8/1900 Scott
1,720,098 A 7/1929 Shreffler et al.

(Continued)

FOREIGN PATENT DOCUMENTS

| | | | |
|---|---|---|---|
| DE | 19513046 | A1 | 11/1995 |
| FR | 466311 | A | 5/1914 |
| WO | WO 2005/093216 | A1 | 10/2005 |

OTHER PUBLICATIONS

International Preliminary Report on Patentability in International Appln. No. PCT/US2021/027679, mailed on Nov. 3, 2022, 7 pages.

(Continued)

*Primary Examiner* — Mary A Davis
(74) *Attorney, Agent, or Firm* — Crowell & Moring LLP

(57) ABSTRACT

A rotational engine system comprises a rotational engine and a propulsion system. The rotational engine includes an outer ring enclosure, an inner ring component, and a drive gear. The inner ring component includes a piston and a drive gear engagement portion. The piston is configured to travel within the outer ring enclosure along a circumference of the outer ring enclosure. The drive gear engagement portion is configured to rotate as the piston travels along the circumference of the circular shape of the outer ring enclosure. The drive gear is coupled to the drive gear engagement portion of the inner ring component such that rotation of the drive gear engagement portion rotationally drives the drive gear.

(Continued)

The propulsion system is configured to deliver propulsive energy to propel the piston along the circumference of the outer ring enclosure.

16 Claims, 17 Drawing Sheets

Related U.S. Application Data continuation of application No. 18/365,085, filed on Aug. 3, 2023, now abandoned, which is a continuation of application No. PCT/US2021/044057, filed on Jul. 30, 2021, and a continuation of application No. PCT/US2021/027679, filed on Apr. 16, 2021.

(60) Provisional application No. 63/183,361, filed on May 3, 2021, provisional application No. 63/181,004, filed on Apr. 28, 2021, provisional application No. 63/146,623, filed on Feb. 6, 2021.

(51) Int. Cl.

| | |
|---|---|
| ***F02B 53/00*** | (2006.01) |
| ***F02B 53/02*** | (2006.01) |
| ***F02B 53/10*** | (2006.01) |
| ***F02B 53/12*** | (2006.01) |
| ***F02B 55/12*** | (2006.01) |
| ***F02B 55/14*** | (2006.01) |
| ***F02B 55/16*** | (2006.01) |

(52) U.S. Cl.
CPC .............. *F02B 53/10* (2013.01); *F02B 53/12* (2013.01); *F02B 55/12* (2013.01); *F02B 55/14* (2013.01); *F02B 55/16* (2013.01)

(58) Field of Classification Search
CPC .......... F02B 55/08; F02B 55/14; F02B 55/16; F01C 1/077; F01C 21/007; F01C 21/008; F01C 21/10; F01C 21/18
See application file for complete search history.

(56) References Cited

U.S. PATENT DOCUMENTS

| | | | | |
|---|---|---|---|---|
| 2,110,524 | A | 3/1938 | Hodges | |
| 2,413,589 | A | 12/1946 | Snyder | |
| 2,627,253 | A | 2/1953 | Lesher | |
| 3,087,671 | A | 4/1963 | Myles | |
| 3,251,347 | A | 5/1966 | Farb | |
| 5,123,394 | A | 6/1992 | Ogren | |
| 5,645,027 | A | 7/1997 | Esmailzadeh | |
| 6,321,693 | B1 | 11/2001 | Kim et al. | |
| 6,615,793 | B1 | 9/2003 | Usack | |
| 6,773,368 | B1 | 8/2004 | Williames | |
| 7,621,254 | B2 | 11/2009 | Rahon | |
| 9,175,562 | B2 | 11/2015 | Casey | |
| 11,619,133 | B2 | 4/2023 | Krasnoff | |
| 12,098,641 | B2 | 9/2024 | Krasnoff | |
| 12,435,632 | B2 * | 10/2025 | Krasnoff | F02B 53/12 |
| 2005/0016493 | A1 | 1/2005 | Hoose | |
| 2005/0284440 | A1 | 12/2005 | Duncan | |
| 2006/0150949 | A1 | 7/2006 | Kovalenko | |
| 2008/0011267 | A1 | 1/2008 | Sakita | |
| 2008/0134998 | A1 | 6/2008 | Nicholson | |
| 2008/0251043 | A1 | 10/2008 | Li | |
| 2022/0018255 | A1 | 1/2022 | Krasnoff | |
| 2024/0141789 | A1 | 5/2024 | Krasnoff | |

OTHER PUBLICATIONS

International Preliminary Report on Patentability in International Appln. No. PCT/US2021/044057, mailed on Aug. 17, 2023, 9 pages.

International Search Report and Written Opinion in International Appln. No. PCT/US2021/027679, mailed on Jul. 16, 2021, 12 pages.

International Search Report and Written Opinion in International Appln. No. PCT/US2021/044057, mailed on Nov. 9, 2021, 15 pages.

* cited by examiner

ROTATIONAL ENGINE WITH A ROTATING COMBUSTION CHAMBER WITH A COMPRESSION MECHANISM COUPLED TO A PISTON

CROSS-REFERENCE TO RELATED PATENT APPLICATIONS

This application is a continuation of U.S. Non-Provisional application Ser. No. 18/606,759, filed Mar. 15, 2024, which is a continuation of U.S. Non-Provisional application Ser. No. 18/365,085, filed Aug. 3, 2023, which is a continuation of PCT Patent Application No. PCT/US2021/044057, filed Jul. 30, 2021, which claims the benefit of and priority to U.S. Provisional Patent Application No. 63/183,361, filed May 3, 2021, U.S. Provisional Patent Application No. 63/181,004, filed Apr. 28, 2021, PCT application PCT/US2021/027679, filed Apr. 16, 2021, and U.S. Provisional Patent Application No. 63/146,623, filed Feb. 6, 2021, which are incorporated herein by reference in their entireties.

BACKGROUND

The present disclosure relates generally to engine systems for use with motor vehicles, electric generators, and various other suitable machines and systems with rotating components. More specifically, the present disclosure relates to a rotational engine configured to more efficiently conserve energy during operation.

SUMMARY

One exemplary embodiment relates to a rotational engine system. The rotational engine system comprises a rotational engine and a propulsion system. The rotational engine includes an outer ring enclosure, an inner ring component, and a drive gear. The outer ring enclosure defines a circular shape. The inner ring component includes a piston and a drive gear engagement portion. The piston is disposed within the outer ring enclosure and is configured to travel within the outer ring enclosure along a circumference of the circular shape of the outer ring enclosure. The drive gear engagement portion is coupled to the piston and is configured to rotate as the piston travels along the circumference of the circular shape of the outer ring enclosure. The drive gear is disposed externally to the outer ring enclosure and is coupled to the drive gear engagement portion of the inner ring component such that rotation of the drive gear engagement portion rotationally drives the drive gear. The propulsion system is configured to deliver propulsive energy into the outer ring enclosure to propel the piston along the circumference of the circular shape of the outer ring enclosure.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to systems and apparatuses that utilize one or more rotational engines. Specifically, the one or more rotational engines each include a plurality of internal pistons attached to an inner ring component disposed within a circular outer ring enclosure. A variety of combustive and/or propulsive processes can be utilized for propelling the internal pistons, and thus the inner ring component, in a circular direction within the circular outer ring enclosure. The inner ring component is further coupled to and configured to drive an external drive ring, which may be utilized to apply rotational power in a variety of settings. For example, in some embodiments, the rotational energy supplied by the rotational engines may be utilized to drive a generator to produce electrical power. In some other embodiments, the rotational energy supplied by the rotational engines may be utilized in to power a motor vehicle. In yet some other embodiments, the rotational energy supplied by the rotational engines may be utilized to power various other systems.

Beneficially, because the pistons and the inner ring component are propelled in a continuous circle within the circular outer ring enclosure, momentum of the pistons and the inner ring component may be conserved during operation. Further, because the pistons are contained within the inner ring component, which is also rotating within the circular outer ring enclosure, frictional losses caused by increased rotational speeds are effectively minimized. In this way, the rotational engines are configured to provide a high level of power while expending less energy as compared to traditional engine systems.

Figure 1:
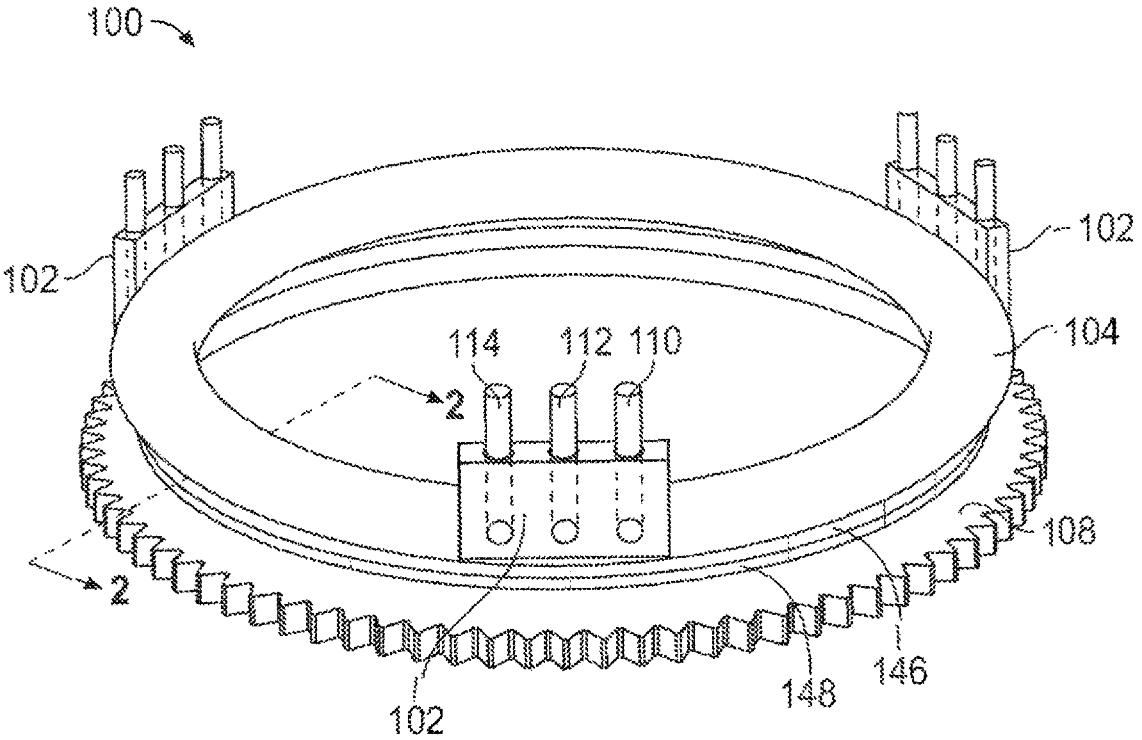
FIG. 1 is a front, upper perspective view of a rotational engine, according to an exemplary embodiment.

Referring now to FIG. 1, a rotational engine 100 is shown, according to one example embodiment. The rotational engine 100 includes one or more propulsion or combustion components 102, an outer ring enclosure 104, an inner ring component 106 (shown in FIG. 6), and a drive gear 108. As a general overview, in some embodiments, a controller (e.g., similar to the controller 906 described in FIG. 9) may be configured to control a propulsion or combustion system (e.g., similar to the propulsion or combustion system 910 described in FIG. 9) to deliver combustive power (e.g., fuel, ignition) and pull exhaust via the one or more combustion components 102 to the rotational engine 100, which may ultimately be used to rotate the drive gear 108, as will be described below.

As shown in FIG. 1, in some embodiments, the rotational engine 100 may include three combustion components 102. However, in some other embodiments, the rotational engine 100 may include more or less combustion components 102, as desired for a given application. For example, in some embodiments, the rotational engine 100 may include between one and twenty combustion components 102, as desired for a given application. For example, in some instances, additional combustion components 102 may be desired to allow for additional combustive power to be provided to the rotational engine 100. In other instances, few combustion components 102 may be desired to reduce the complexity of the rotational engine 100.

As also shown in FIG. 1, in some embodiments, the combustion components 102 may be arranged about and coupled to the radially-outward facing circumferential surface of the outer ring enclosure 104. However, it should be appreciated that, in other embodiments, the combustion components 102 may be arranged in similar or dissimilar manners. For example, in some embodiments, the combustion components 102 may be arranged about and coupled to the radially-inward facing circumferential surface of the outer ring enclosure 104 (e.g., similar to the configuration of the combustion components 914 depicted in FIG. 9). In other embodiments, the combustion components 102 may be arranged about the circumference of the outer ring enclosure 104, but may instead be coupled to a top surface, a bottom surface, or any other surface of the outer ring enclosure 104, as desired for a given application. In yet some other embodiments, the combustion components 102 may be arranged in an uneven distribution about the circumference of the outer ring enclosure (e.g., all of the combustion components 102 may be arranged toward one side of the outer ring enclosure 104).

Each combustion component 102 is coupled to a propulsion or combustion system (e.g., similar to the propulsion or combustion system 910), which is configured to provide fuel (e.g., gasoline, liquid oxygen, liquid hydrogen, and/or other liquid or gas fuels) and ignition (e.g., an electrical spark, a controlled electrical arc explosion, a controlled magnetic pressure explosion) to and pull exhaust from combustion chambers 118 (shown in FIG. 3) of the inner ring components 106 via the combustion components 102 to effectively deliver combustive power to the rotational engine 100. In some embodiments, the combustion system may be configured to pre-mix various liquid fuels with air before injecting the fuel into the various combustion chambers 118. In some other embodiments, the combustion system may be configured to provide air simultaneously with the fuel into the combustion chambers 118.

Each combustion component 102 includes a plurality of propulsion or combustion ports, such as a fuel port 110, an ignition port 112, and an exhaust port 114. The fuel port 110 is configured to deliver fuel through a corresponding fuel aperture 116 of the outer ring enclosure 104 into a corresponding combustion chamber 118 (shown in FIG. 3) of the inner ring component 106. The ignition port 112 is configured to provide an ignition event through a corresponding ignition aperture 120 of the outer ring enclosure 104 into the corresponding combustion chamber 118 of the inner ring component 106. The exhaust port 114 is configured to pull exhaust from within the corresponding combustion chamber 118 of the inner ring component 106 through a corresponding exhaust aperture 122 of the outer ring enclosure 104.

In some embodiments, the fuel port 110, the ignition port 112, and the exhaust port 114 of each combustion component 102 are configured to deliver fuel and ignition and to pull exhaust from the combustion chamber 118 at various angles with respect to an outer surface of the outer ring enclosure 104. For example, in some instances, the fuel port 110, the ignition port 112, and the exhaust port 114 of each combustion component 102 are configured to deliver fuel and ignition and to pull exhaust from the corresponding combustion chamber 118 at a normal angle (i.e., directly outward or inward) with respect to the outer surface of the outer ring enclosure 104. In some other instances, the fuel port 110, the ignition port 112, and the exhaust port 114 of each combustion component 102 are configured to deliver fuel and ignition and to pull exhaust from the corresponding combustion chamber 118 at an angle from the normal direction with respect to the outer surface of the outer ring enclosure 104 of between zero (i.e., normal to the outer surface) and seventy degrees. Accordingly, the fuel, ignition, and exhaust may be pushed to and/or pulled from the combustion chamber 118 at an angle to aid the propulsion of the inner ring component 106.

Further, in some embodiments, during operation, fuel and air may be injected into the combustion chamber 118 through a seal which compresses against the inner ring component 106 around the fuel apertures 116 and the ignition apertures 120, where the seal may move into position in a timed manner when the fuel apertures 116 and the ignition apertures 120 are aligned with the apertures of the outer ring enclosure 104. In some instances, the fuel and the air may also be pre-accelerated before being injected into the combustion chamber 118.

Figure 2:
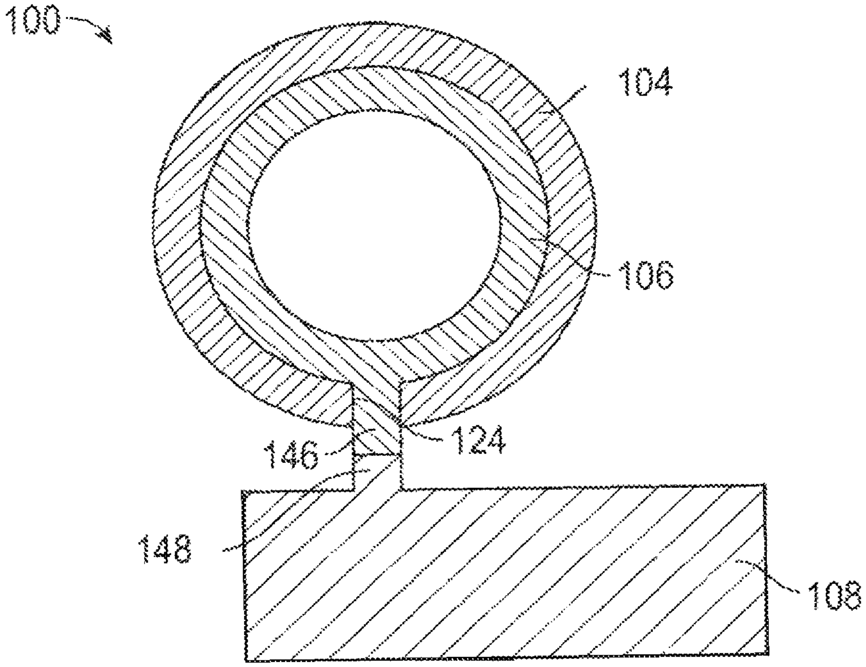
FIG. 2 is a cross-sectional view of the rotational engine of FIG. 1 taken along line 2-2, according to an exemplary embodiment.
Figure 5:
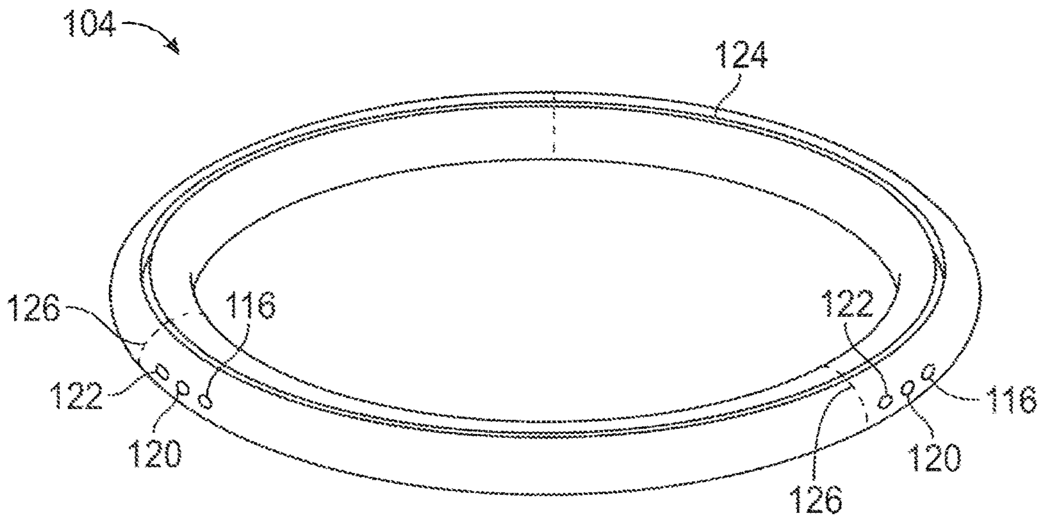
FIG. 5 is a rear, lower perspective view of an outer ring enclosure of the rotational engine of FIG. 1, according to an exemplary embodiment.

Referring now to FIGS. 1, 2, and 5, the outer ring enclosure 104 is a generally circular, ring-shaped tube. In some embodiments, the outer ring enclosure 104 defines a generally circular cross-sectional profile (as shown in FIG. 2). In some other embodiments, the outer ring enclosure 104 may define various other cross-section profile shapes, such as, for example, a square shape, a rectangular shape, an ellipsoidal shape, a triangular shape, or any other suitable shape as desired for a given application.

The outer ring enclosure 104 may be comprised of a variety of materials. In some embodiments, the outer ring enclosure 104 is comprised of a metallic material. For example, the outer ring enclosure 104 may be comprised of cast iron, stainless steel, steel alloy, aluminum alloy, or any other suitable metallic material. In some instances, the various surfaces of the outer ring enclosure 104 may be coated in a specialized coating (e.g., a diamond-like coating) to improve thermal capacity of the outer ring enclosure 104.

In some embodiments, the outer ring enclosure 104 includes a plurality of propulsion or combustion apertures, such as one or more fuel apertures 116, one or more ignition apertures 120, one or more exhaust apertures 122. The outer ring enclosure 104 further includes an inner ring drive channel 124. The one or more fuel apertures 116 are configured to allow for fuel to be delivered from the combustion system through a corresponding one of the combustion components 102 into a corresponding combustion chamber 118 of the inner ring component 106. The one or more ignition apertures 120 are configured to allow for an ignition source (e.g., an electric spark, an electric arc explosion, a magnetic pressure explosion) to be provided or directed from the propulsion or combustion system through a corresponding one of the combustion components 102 into a corresponding combustion chamber 118 of the inner ring component 106. The one or more exhaust apertures 122 are configured to allow for exhaust to be pulled from within a corresponding combustion chamber 118 of the inner ring component 106, through a corresponding one of the combustion components 102, to and out of the propulsion or combustion system.

In some embodiments, the fuel apertures 116, the ignition apertures 120, and the exhaust apertures 122 may be sized according to a desired power output of the rotational engine 100. For example, a size of the fuel apertures 116, the ignition apertures 120, and the exhaust apertures 122 may be increased for higher power or decreased for higher power. In some other instances, the number of fuel apertures 116, the number of ignition apertures 120, and/or the number of exhaust apertures 122 may additionally or alternatively be increased or decreased according to the desired power output of the rotational engine 100. For example, a number of fuel apertures 116, ignition apertures 120, and/or exhaust apertures 122 may be increased for higher power or decreased for lower power. In either case, with larger or more apertures, the amount of fuel, the effectiveness of the ignition, and/or the increased capacity for exhaust may allow for a higher power output of the rotational engine 100.

In some embodiments, the outer ring enclosure 104 may include two, three, four, five, six, or any other number of fuel, ignition, and exhaust apertures. In some embodiments, the outer ring enclosure 104 may include several fuel, ignition, and exhaust apertures for that are configured to simultaneously deliver fuel and ignition to and pull exhaust from a corresponding combustion chamber 118 simultaneously. In some embodiments, as a size of the outer ring enclosure 104 increases, a number of fuel, ignition, and exhaust apertures may be increased to allow for more fuel to be provided into the combustion chambers 118, more effective ignition of the fuel to be achieved within the combustion chambers 118, and/or more exhaust to be pulled from the combustion chambers 118.

Additionally, in some instances, the fuel apertures 116, the ignition apertures 120, and/or the exhaust apertures 122 may be selectively opened and closed by the controller (e.g., similar to the controller 906) in a timed manner. Specifically, the controller may be configured to control the opening and closing of the fuel apertures 116 and/or the ignition apertures 120 to prevent the combustion event within the combustion chamber 118 from inadvertently travelling back through fuel apertures 116. Similarly, the controller may be configured to control the opening and closing of the exhaust apertures 122 to prevent premature exhaust of the fuel delivered into the combustion chamber 118.

The inner ring drive channel 124 is an opening in the outer ring enclosure 104 configured to allow for the inner ring component 106 to engage the drive gear 108, as will be further discussed below. As shown in FIG. 5, in some embodiments, the inner ring drive channel 124 may extend around the circumference of the outer ring enclosure 104 through a bottom surface of the outer ring enclosure 104. However, it should be appreciated that the inner ring drive channel 124 may alternatively extend through various other surfaces of the outer ring enclosure 104. For example, in some instances, the inner ring drive channel 124 may extend around the circumference of the outer ring enclosure 104 through a radially-inner surface, a radially-outer surface, a top surface, or any other surface, as desired for a given application. In any case, the inner ring drive channel 124 defines a circular shaped opening about the circumference of the outer ring enclosure 104.

In some instances, the outer ring enclosure 104 may optionally include one or more gate openings 126. The gate openings 126 are configured to allow for actuatable gates (e.g., gate 802 shown in FIG. 8) to be selectively inserted within the outer ring enclosure 104 to selectively enclose a combustion chamber (similar to the combustion chamber 118) within the outer ring enclosure 104 when an alternative piston ring component 700 (shown in FIG. 7) is utilized, as will be further described below. In some embodiments, the gate openings 126 may be configured to mechanically open to allow for the actuatable gates to be inserted therethrough to selectively enclose the combustion chamber 118. In some other embodiments, the gate openings 126 may be fit with a sealing component configured to allow a corresponding actuatable gate to be pushed through the sealing component to selectively enclose the combustion chamber, and then to create a seal (e.g., a hermetic seal) when the actuatable gate is pulled back out of the gate opening 126. For example, in some embodiments, the sealing component may be a rubber sealing component (e.g., a pair of overlapping rubber ring components).

Figure 3:
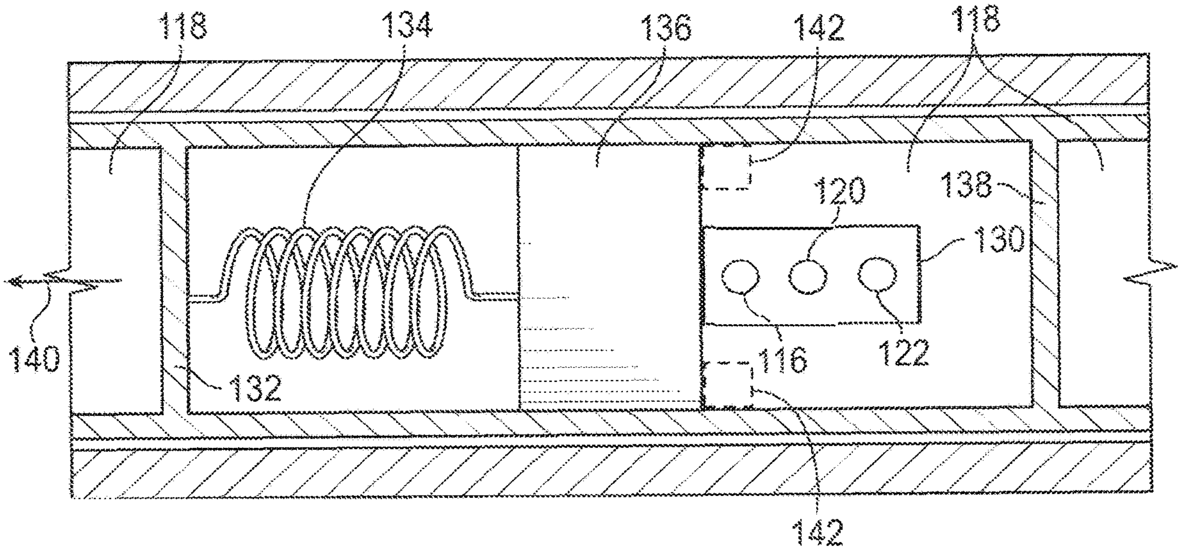
FIG. 3 is a cross-sectional view of a combustion chamber of the rotational engine of FIG. 1, according to an exemplary embodiment.
Figure 6:
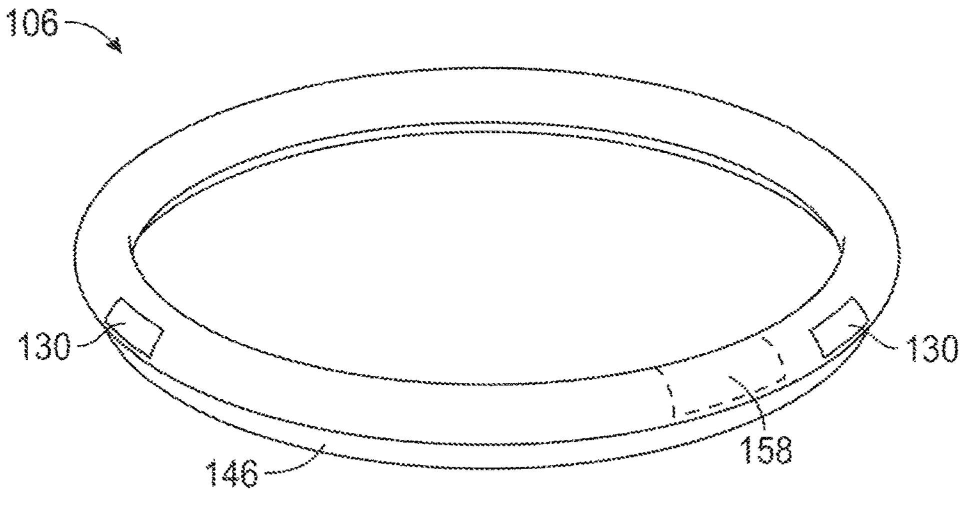
FIG. 6 is a front, upper perspective view of an inner ring component of the rotational engine of FIG. 1, according to an exemplary embodiment.

Referring now to FIGS. 2, 3, 6, the inner ring component 106 is similarly a generally circular, ring-shaped tube. In some embodiments, the inner ring component 106 defines a generally circular cross-sectional profile (as shown in FIG. 2). In some other embodiments, the inner ring component 106 may define various other cross-section profile shapes, such as, for example, a square shape, a rectangular shape, an ellipsoidal shape, a triangular shape, or any other suitable shape as desired for a given application. In any case, however, the inner ring component 106 defines a substantially similar cross-section profile as the outer ring enclosure 104.

Further, the inner ring component 106 defines a slightly smaller cross-section profile with respect to the outer ring enclosure, such that the inner ring component 106 may rotate within the outer ring enclosure 104. For example, in some instances, the outer ring enclosure 104 have a cross section diameter of between two inches and twelve inches, as necessary for a given application. For example, in some instances, the outer ring enclosure 104 may have a cross section diameter of two inches, four inches, six inches, eight inches, twelve inches, or any other suitable diameter, as necessary for a given application. In any of these cases, the inner ring component 106 may define a slightly smaller cross-section profile (e.g., 1% less, 2% less, 3% less, 4% less, 5% less) such that the inner ring component 106 may fit within the outer ring enclosure 104.

The inner ring component 106 may be comprised of a variety of materials. In some embodiments, the inner ring component 106 is similarly comprised of a metallic material. For example, the inner ring component 106 may be comprised of cast iron, stainless steel, steel alloy, or any other suitable metallic material. In some embodiments, the inner ring component 106 may be made of a lightweight metal material, such as aluminum alloy, to reduce the weight of the inner ring component 106. In some instances, the various surfaces of the inner ring component 106 may similarly be coated in a specialized coating (e.g., a diamondlike coating) to improve thermal capacity of the inner ring component 106.

The inner ring component 106 includes one or more combustion chambers 118. Each combustion chamber 118 may include a chamber window 130, a piston wall 132, a compression mechanism 134, a piston 136, and a trailing wall 138. During operation, the chamber window 130 is configured to allow for the propulsion or combustion system to deliver combustive or propulsive power (e.g., controlled explosions) to and to pull exhaust from the combustion chamber 118 via the various apertures (e.g., the fuel aperture 116, the ignition aperture 120, and the exhaust aperture 122) of the outer ring enclosure 104.

As shown in FIG. 3, in some embodiments, the inner ring component 106 includes a plurality of combustion chambers 118 disposed adjacent to one another. In some instances, the plurality of combustion chambers 118 may be disposed about and span the circumference of the toroidal shape formed by the inner ring component 106. For example, in some instances, the inner ring component 106 may include 2, 3, 4, 5, 6, 7, 8, 9, 10, or more combustion chambers 118.

With continued reference to FIG. 3, within each combustion chamber 118, the compression mechanism 134 is disposed between the piston wall 132 and the piston 136. During operation, when combustive or propulsive power (e.g., a controlled explosion) is delivered to the combustion chamber 118, the propulsion or combustion system is configured to time the delivery of the propulsion or combustion into the combustion chamber 118 such that the combustion occurs between the piston 136 and the trailing wall 138. Accordingly, when the propulsion or combustion occurs, it forces the piston 136 away from the trailing wall 138 and toward the piston wall 132. As the piston 136 moves toward the piston wall 132, the compression mechanism 134 is configured to elastically compress. The compression mechanism 134 then transfers this elastic compression force onto the piston wall 132 to drive the piston wall 132, and thus the entire inner ring component 106, in a drive direction 140.

In some embodiments, the compression mechanism 134 may comprise a compression spnng. In some other embodiments, the compression mechanism 134 may be a hermetically sealed pocket of air between the piston wall 132 and the piston 136 that is configured to act as a pneumatic spring. In yet some other embodiments, the compression mechanism 134 may instead be a collapsible portion of the inner ring component 106 configured to slightly deform (e.g., collapse or "break") to allow the piston 136 to move forward with respect to the trailing wall 138. In yet some other embodiments, the compression mechanism 134 may be any other suitable type of force absorbing and transferring device. In either case, the compression mechanism 134 is configured to elastically compress and transfer force from the piston 136 to the piston wall 132, as discussed above.

It should be appreciated that, although the fuel apertures 116, ignition apertures 120, exhaust apertures 122, chamber windows 130 are all shown on a radially outer section of the rotational engine 100 (i.e., with respect to the toroidal shape defined by the outer ring enclosure 104 and the inner ring component 106), there may additionally or alternatively be fuel apertures 116, ignition apertures 120, exhaust apertures 122, and chamber windows 130 arranged on the top section, radially inner section, and/or a bottom section of the rotational engine 100, as desired for a given application.

In some instances, the number of fuel apertures 116, ignition apertures 120, and exhaust apertures 122 may be equal to the number of combustion chambers 118 of the inner ring component 106. In some other instances, the number of fuel apertures 116, ignition apertures 120, and exhaust apertures 122 may be more or less than then number of combustion chambers 118 of the inner ring component 106, as desired for a given application. For example, in some embodiments, there may be multiple fuel apertures 116 (e.g., 2, 3, 4), multiple ignition apertures 120 (e.g., 2, 3, 4), and/or multiple exhaust apertures 122 (e.g., 2, 3, 4) configured to simultaneously provide fuel or ignition to and/or pull exhaust from each combustion chamber 118 (e.g., via a top surface, a bottom surface, a radially inner surface, and/or a radially outer surface).

In some embodiments, each combustion chamber 118 may further include a locking mechanism 142 disposed within the combustion chamber 118. The locking mechanism 142 may be positioned within the combustion chamber 118 and configured to prevent the piston 136 from moving past a certain point in the direction of the trailing wall 138. For example, during operation, it may be desirable to prevent the piston 136 from covering or partially covering the fuel aperture 116 (e.g., at the time of fuel injection). Accordingly, as shown in FIG. 3, the locking mechanism 142 is located such that the piston 136 is prevented from covering the fuel aperture 116.

In some instances, the locking mechanism 142 is a pair of opposed protrusions extending radially-inward into the combustion chamber 118 from an inner surface 144 of the combustion chamber 118. In some instances, the locking mechanism 142 alternatively defines a ring shape configured to similarly extend radially-inward into the combustion chamber 118 from the inner surface 144 of the combustion chamber 118. In either case, the locking mechanism 142 may be coupled to or integrally formed with the inner surface 144 of the combustion chamber 118. In either case, in some embodiments, the locking mechanism 142 may extend radially inward from an inner surface of the combustion chamber 118 between 2.5% and 5% of the way into the combustion chamber 118, such that the locking mechanism 142 fills approximately 5% to 10% of an inner diameter of the combustion chamber 118.

As best shown in FIG. 2, the inner ring component 106 further includes a drive gear engagement section 146. The drive gear engagement section 146 is configured to extend through the inner ring drive channel 124 of the outer ring enclosure 104. In some embodiments, the drive gear engagement section 146 may define a width of between 0.1 inches and 0.5 inches. In some other embodiments, the drive gear engagement section 146 may define a width of between 0.05 inches and 1 inches. In some embodiments, the drive gear engagement section 146 may be sized relative to a diameter of a cross-section profile of the inner ring component 106. Accordingly, for larger rotational engines (e.g., similar to the rotational engine 100), the drive gear engagement section 146 may be larger than the provided ranges, as deemed appropriate for a given application. In any case, the inner ring drive channel 124 may be sized to allow the drive gear engagement section 146 to pass through.

The drive gear engagement section 146 is further configured to engage an inner ring engagement section 148 of the drive gear 108 to allow for the inner ring component 106 to provide rotational power to the drive gear 108. In some embodiments, the drive gear engagement section 146 is fixedly coupled to the drive gear 108. For example, the drive gear engagement section 146 may be welded, fastened, adhered, or otherwise permanently fixed to the drive gear 108. In some other embodiments, the drive gear engagement section 146 is selectively coupled to the drive gear 108. For example, the drive gear engagement section 146 may be selectively coupled to the drive gear 108 via a clutch-type mechanism.

As shown in FIG. 2, the drive gear engagement section 146 extends downward from a bottom of the inner ring component 106. The drive gear engagement section 146 further extends about the circumference of the inner ring component 106 (as shown in FIG. 1). Accordingly, the drive gear engagement section 146 defines a generally circular-shaped protrusion (should add this to FIG. 6).

It should be appreciated that the drive gear engagement section 146 may be arranged differently depending on the configuration of the outer ring enclosure 104 and the drive gear 108. For example, in some instances, the inner ring drive channel 124 may be around on a radially outer wall, a radially inner wall, or a top wall, as desired for a given application. In these instances, the drive gear engagement section 146 may similarly extend radially inward, radially outward, or upward from the inner ring component 106 as necessary.

As shown in FIGS. 1 and 2, in some embodiments, the drive gear 108 is arranged below the outer ring enclosure 104 and the inner ring component 106. In some other embodiments, the drive gear 108 may be arranged differently with respect to the outer ring enclosure 104 and the inner ring component 106. For example, depending on the arrangement of the inner ring drive channel 124 and the drive gear engagement section 146, the drive gear 108 may be arranged below, above, or radially outward from the outer ring enclosure 104 and the inner ring component 106.

As referenced above, the drive gear 108 includes the inner ring engagement section 148. As shown in FIG. 2, in some embodiments, the inner ring engagement section 148 extends upward from an upper surface of the drive gear 108. In other embodiments, depending on the arrangement of the inner ring drive channel 124 and the drive gear engagement section 146, the inner ring engagement section 148 may be arranged differently to engage the drive gear engagement section 146.

For example, in some embodiments, where the drive gear 108 is arranged above the outer ring enclosure 104 and the inner ring component 106, the inner ring drive channel 124 and the drive gear engagement section 146 may each be arranged on the top of the outer ring enclosure 104 and the inner ring component 106, respectively. Accordingly, in these embodiments, the inner ring engagement section 148 may alternatively extend downward from a lower surface of the drive gear 108. In some other embodiments, where the drive gear 108 is arranged radially outward from the outer ring enclosure 104 and the inner ring component 106, the inner ring drive channel 124 and the drive gear engagement section 146 may each be arranged on the radially outer side of the outer ring enclosure 104 and the inner ring component 106, respectively. Accordingly, in these embodiments, the inner ring engagement section 148 may alternatively extend radially inward from a radially-inward facing surface of the drive gear 108.

Now that the various components of the rotational engine 100 have been described above, an example method of operation of the rotational engine 100 will be discussed below. It should be appreciated that the following method of operation is provided as an example. Various other methods of operation are possible and are intended to be within the scope of the present disclosure.

For example, as referenced above, a controller (similar to the controller 906) may be operatively coupled to a propulsion or combustion system (e.g., similar to the propulsion or combustion system 910) to provide combustive energy to the rotational engine 100. During operation, the controller may be configured to control the propulsion or combustion system to provide fuel and ignition to and pull exhaust from the one or more combustion chambers 118 of the inner ring component 106 to drive the inner ring component 106, and thus the drive gear 108, rotationally with respect to the outer ring enclosure 104.

Specifically, as referenced to above, the controller may be configured to control the propulsion or combustion system to provide fuel and ignition to and pull exhaust from the one or more combustion chambers 118 via the one or more combustion components 102. For example, the propulsion or combustion system may provide fuel and ignition through the fuel port 110 and the ignition port 112, respectively, of each combustion component 102 into one or more corresponding combustion chambers 118 via one or more fuel apertures 116 and one or more ignition apertures 120, respectively, of the outer ring enclosure 104. The propulsion or combustion system may further pull exhaust through the exhaust port 114 of each combustion component 102 from one or more corresponding combustion chambers 118 via one or more exhaust apertures 122 of the outer ring enclosure 104.

Accordingly, in some embodiments, various quantities of fuel (or air-fuel mixture) may be injected into the one or more combustion chambers 118 and an ignition source (e.g., an electrical spark) may be provided into each corresponding combustion chamber 118 to ignite the fuel to drive the pistons 136 (and thus the entire inner ring component 106) around the outer ring enclosure 104. In some instances, the fuel (or air-fuel mixture) and the ignition source may be provided into each combustion chamber 118 at approximately the same time. Shortly after the fuel is ignited within the combustion chamber 118, the exhaust may be pulled from each corresponding combustion chamber 118 by the propulsion or combustion system. In some embodiments, fuel may be provided to a first combustion chamber 118 at the same time as exhaust is pulled from a second combustion chamber 118 (e.g., the combustion chamber 118 ahead or behind the combustion chamber 118 having fuel delivered thereto).

In some embodiments, the controller is configured to rapidly and repeatedly provide combustive power to the combustion chambers 118 to drive the pistons 136, and thus the entire inner ring component 106, in the drive direction 140 within the outer ring enclosure 104. Further, the combustive power may be provided to the combustion chambers 118 in a timed manner, such that the fuel, ignition, and exhaust are effectively supplied and pulled through the chamber windows 130 as the inner ring component 106 rotates. Accordingly, a rotational speed of the inner ring component 106 increases the speed of the propulsion or combustion delivery increases, which may, in turn, further increase the speed of the inner ring component 106, and thereby the drive gear 108.

In some embodiments, where the rotational engine 100 includes multiple fuel apertures 116, ignition apertures 120, and exhaust apertures 122 for each combustion chamber 118 (e.g., disposed about the cross sectional circumference of the inner ring component 106 and configured to deliver fuel/ignition and pull exhaust from a corresponding combustion chamber 118 simultaneously), as the rotational speed of the inner ring component 106 increases, the controller may be configured to alternate firing of the fuel and ignition and pulling of exhaust between each of the multiple fuel apertures 116, ignition apertures 120, and exhaust apertures 122 in succession for successive combustion chambers 118 as they rotate past the corresponding apertures to allow for a faster rate of firing. Accordingly, the rate of firing is not constrained by the firing speed of the fuel injection, ignition, and/or exhaust systems. For example, the firing may be alternated for every three combustion chambers, every four combustion chambers, every five combustion chambers, etc.

In some embodiments, a cooling system (e.g., similar to the cooling system 912 shown in FIG. 9) may be configured to supply cooling fluid and/or lubricant to the various components of the rotational engine 100 during operation. For example, in some embodiments, the cooling system may be configured to provide lubricant between the outer ring enclosure 104 and the inner ring component 106 to decrease frictional losses. Similarly, lubricant may be supplied to the various pistons 136 within the corresponding combustion chambers 118. In some embodiments, each of the outer ring enclosure 104 and the inner ring component 106 may each be coupled to an oil well configured to selectively supply oil into and between the outer ring enclosure 104 and the inner ring component 106 (e.g., via apertures similar to the fuel apertures 116, the ignition apertures 120, and the exhaust apertures 122). In some instances, the fit between the outer ring enclosure 104 and the inner ring component 106 may effectively push the oil around the inner ring component 106 within the outer ring enclosure 104 as the inner ring component 106 rotates within the outer ring enclosure 104.

In some embodiments, the propulsion or combustion system may be configured to pull a vacuum within the outer ring enclosure 104 and the inner ring component 106 during operation to reduce friction within the rotational engine 100. In these embodiments, the propulsion or combustion system may further be configured to deliver both fuel and air into the combustion chambers 118 prior to ignition via the corresponding fuel ports 110, and to again pull a vacuum within the outer ring enclosure 104 and the inner ring component 106 via the corresponding exhaust apertures 122.

As the inner ring component 106 is driven around the outer ring enclosure 104, the inner ring component 106 drives the drive gear 108 to rotate. Accordingly, the rotational engine 100 is configured to rotate the drive gear 108 to provide power to various systems. For example, the drive gear 108 may be coupled, via various gears, gear boxes, and/or transmissions (e.g., similar to vertical gears 934, the horizontal gears 936, and/or the gear box 904 shown in FIG. 9), to a variety of rotational drive units. Accordingly, in some embodiments, the rotational engine 100 may be configured to supply rotational power to wheels of a vehicle or other suitable driving application, a propeller of a boat or ship, an electric generator, or any other suitable system, as desired for a given application.

In some instances, when the drive gear 108 is used to provide rotational energy to a corresponding system, only a fraction of the driving force may be utilized at any given time to conserve momentum of the inner ring component 106 within the outer ring enclosure 104. That is, the controller may prevent the driving force applied by the drive gear 108 from exceeding a predetermined threshold percentage (e.g., 50%, 75%, 90%) of the total potential power output of the rotational engine 100. By conserving momentum of the inner ring component 106 within the outer ring enclosure 104, the rotational engine 100 may maintain a high level of efficiency while providing power to the corresponding system.

Figure 4:
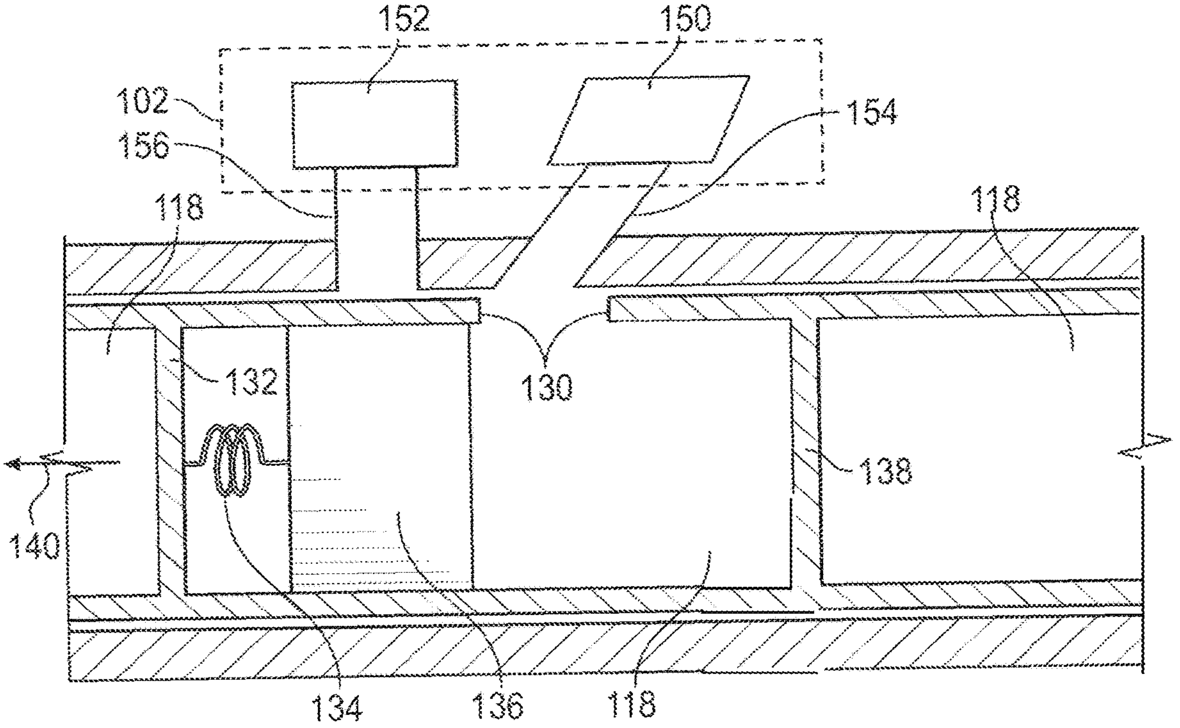
FIG. 4 is a cross-sectional view of an alternative combustion chamber of the rotational engine of FIG. 1, according to an exemplary embodiment.

In some instances, as shown in FIG. 4, the combustion component 102 may additionally or alternatively include a directed propulsion device 150 and an exhaust device 152. The directed propulsion device 150 may be configured to create and direct propulsive power (e.g., combustion, electric arc explosion, magnetic pressure explosion) from outside of the combustion chamber 118 into the combustion chamber 118 via an angled propulsion port 154. As illustrated in FIG. 4, the angled propulsion port 154 is angled with respect to the combustion chamber 118 such that the directed propulsive power is configured to propel the piston 136 in the drive direction 140. It should be appreciated that, in some instances, the angled propulsion port 154 can be non-angled but perpendicular to the outer ring enclosure 104. The exhaust device 152 is configured to pull exhaust from within the combustion chamber 118 via an exhaust device port 156.

The exhaust device port 156 may be arranged ahead (i.e., further in the drive direction 140) of the angled propulsion port 154. As such, as the inner ring component 106 rotates in the drive direction 140, the chamber window 130 first passes over the angled propulsion port 154. As such, the directed propulsion device 150 may first direct propulsive power through angled propulsion port 154 and the chamber window 130 onto the piston 136 within the combustion chamber 118. Then, as the inner ring component 106 continues to rotate in the drive direction 140, the chamber window 130 passes past the angled propulsion port 154 and over the exhaust device port 156. As such, after the directed propulsion device 150 directs the propulsive power onto the piston 136, any exhaust associated with the propulsive power may be effectively exhausted out of the combustion chamber 118.

It should be appreciated that, in some embodiments, magnetic pressure and electric arc explosion propulsion systems may not use an exhaust. However, in some other instances, magnetic pressure and electric arc explosion propulsion systems may use an exhaust.

In the embodiments shown in FIG. 4, the controller may be similarly configured to rapidly and repeatedly provide propulsive power to the combustion chambers 118 in a timed manner to drive the pistons 136, and thus the entire inner ring component 106, in the drive direction 140. In some other embodiments, the controller may be configured to continuously apply propulsive power (e.g., combustive power, electric arc explosive power, magnetic pressure explosive power) from the directed propulsion device 150 through the angled propulsion port 154. In these embodiments, as the inner ring component 106 rotates, the outer wall of the inner ring component 106 may substantially block the propulsive power from entering the combustion chamber 118, only permitting the propulsive power to enter the combustion chamber 118 when the chamber window 130 passes over the angled propulsion port 154.

Accordingly, in some instances, the rotational engine 100 may be powered utilizing directed electric arc explosions and/or magnetic pressure explosions that are injected into the various combustion chambers 118 to drive the inner ring component 106 and, thereby, the drive gear 108. In these instances, the rotational engine 100 may be completely electrically powered. Further, in some instances, the amount of electrical energy used to fire the electric arc explosions and/or the magnetic pressure explosions may be less than an output energy harnessed from the drive gear 108 by an electric generator. Additionally, when utilizing the directed electric arc explosions and/or magnetic pressure explosions to propel the inner ring component 106, if a vacuum pulled within the outer ring enclosure 104 and the inner ring component 106, the propulsion or combustion system does not need to inject air into the combustion chambers 118.

Figure 7:
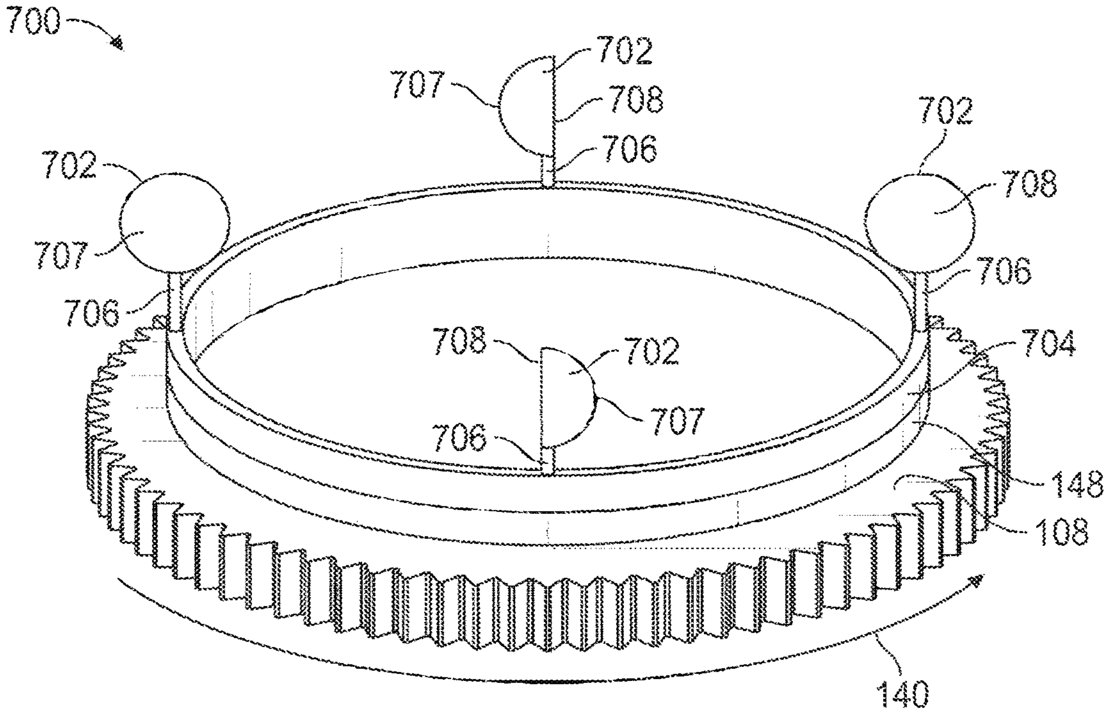
FIG. 7 is a front, upper perspective view of a piston ring component for use with the rotational engine of FIG. 1, according to an exemplary embodiment.

Referring now to FIG. 7, a piston ring component 700 for use within the rotational engine 100 is shown, according to an exemplary embodiment. The piston ring component 700 is configured to be utilized in place of the inner ring component 106 discussed above. The piston ring component 700 includes a plurality of pistons 702. When assembled, the plurality of pistons 702 are configured to be disposed within the outer ring enclosure 104 in place of the inner ring component 106. Accordingly, the combustive power provided by the propulsion or combustion system within the outer ring enclosure 104 is configured to propel the plurality of pistons 702 around the circumference of the outer ring enclosure 104 (similar to the pistons 136 and combustion chambers 118 of the inner ring component 106).

Each of the plurality of pistons 702 is coupled to a drive gear engagement section 704 by a corresponding piston shaft 706. Accordingly, as the plurality of pistons 702 are driven around the outer ring enclosure 104, the plurality of pistons 702 are configured to drive the drive gear engagement section 704. The drive gear engagement section 704 is further configured to engage the drive gear 108. For example, in some embodiments, the drive gear engagement section 704 may be rigidly fixed to the drive gear 108. In some other embodiments, the drive gear engagement section 704 may be configured to selectively engage the drive gear 108 via a clutch or any other selectively engagement mechanism.

As illustrated in FIG. 7, in some embodiments, each of the pistons 702 may have a leading surface 707 and a trailing surface 708. In some embodiments, the leading surface 707 is aerodynamically shaped to reduce drag as the pistons 702 are propelled around the outer ring enclosure 104. For example, in some embodiments, the leading surface 707 may define an arcuate shape (as shown in FIG. 7). In some other embodiments, the leading surface 707 may alternatively define a pointed shape (e.g., that comes to a point in the direction of the drive direction 140). In some other embodiments, the leading surface 707 may define a variety of other aerodynamic shapes. In some embodiments, the trailing surface 708 is generally flat or slightly concave to aid in the capture of the combustive energy applied thereto.

Accordingly, the piston ring component 700 may be used in place of the inner ring component 106 described above. In these scenarios, the controller may control the rotational engine 100 in a similar manner to the manner described above.

Figure 8:
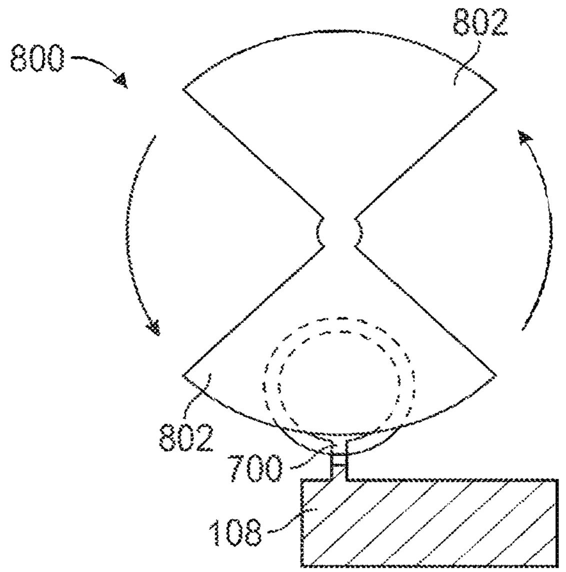
FIG. 8 is a front view of an actuatable gate mechanism for use with the rotational engine of FIG. 1, according to an exemplary embodiment.

Referring now to FIG. 8, in some instances, to aid in the effective propulsion of the pistons 702 around the outer ring enclosure 104, an actuatable gate mechanism 800 may be utilized. The actuatable gate mechanism 800 may be particularly useful when the rotational engine 100 utilizes traditional combustion processes. In these instances, the actuatable gate mechanism 800 is configured to selectively actuate a gate 802 into the outer ring enclosure 104 behind the piston 702 prior to the combustion process.

For example, the actuatable gate mechanism 800 may be configured to selectively pass the gate 802 through the gate openings 126 in the outer ring enclosure 104. The combustion process may then be configured to take place within the outer ring enclosure 104 between the trailing surface 708 of the piston 702 and the gate 802, such that the combustive energy is more efficiently applied to the piston 702. Accordingly, as a piston 702 passes a gate opening 126, the actuatable gate mechanism 800 is configured to selectively actuate a gate 802 into the outer ring enclosure 104 to create a sealed area between the trailing surface 708 and the gate 802. The rotational engine 100 is then configured to provide combustive power (i.e., a controlled explosion) into the sealed area between the outer ring enclosure 104 between the trailing surface 708 of the piston 702 and the gate 802. After the combustive power has been delivered, the gate 802 is then selectively removed from the outer ring enclosure 104, such that, as the piston ring component 700 rotates, the next piston 702 is allowed to pass gate opening 126. The gate 802 may then be reinserted into the outer ring enclosure 104 behind the subsequent piston 702 and the process may be repeated.

Accordingly, the controller may be configured to actuate the actuatable gate mechanism 800 in a timed manner to insert and remove the gate 802 from the outer ring enclosure 104 prior to and after each combustive process provided to the outer ring enclosure 104. This process may be rapidly and repeatedly performed as a rotational speed of the piston ring component 700 mcreases.

As depicted in FIG. 8, in some embodiments, the actuatable gate mechanism 800 may be a rotationally actuatable gate mechanism configured to rotate one or more gates 802 into and out of the outer ring enclosure 104. As shown, the gates 802 may be formed from a semi-filled disk shape, such that the gates 802 resemble blades on a fan. In other embodiments, the gates 802 may each define a substantially circular shape configured to cover a majority of cross section opening within the outer ring enclosure 104. In some other embodiments, the actuatable gate mechanism 800 may be a linear actuatable gate mechanism configured to slide one or more gates (e.g., similar to the gates 802) into and out of the outer ring enclosure 104.

In some embodiments, the actuatable gate mechanism 800 may be powered by a variety of power sources. For example, the actuatable gate mechanism 800 may be electrically powered, hydraulically powered, pneumatically powered, or powered using any other suitable method, as desired for a given application.

In some embodiments, the actuatable gate mechanism 800 may alternatively be utilized with the inner ring component 106 discussed above. In these embodiments, the inner ring component 106 may not include the trailing wall 138, and may instead include a gate receiving opening 158 (shown by the dashed lines in FIG. 6). The gate receiving opening 158 may be configured to selectively open and close to allow for the insertion of the gates 802 into the inner ring component behind the piston 136 within the combustion chamber 118. Accordingly, the actuatable gate mechanism 800 may similarly selectively actuate the gates 802 into and out of the combustion chambers 118 of the inner ring component 106 in a similar method to the method described above, with reference to the piston ring component 700.

In some embodiments, the gate (e.g., the gate 802) may have an opening where a connector from the interior ring (e.g., the inner ring component 106) connects the two interior ring portions on either side of the gate 802. In these embodiments, the gate may be formed in two halves with spaces missing for the interior ring connector which may be at the center of the gate. The two halves may come from opposite sides of the exterior ring (e.g., the outer ring enclosure 104) and interior ring and connect within the interior ring to form the gate. The interior ring walls in front of the gate (i.e., toward the drive direction 140) may expand along the length of the walls as the combustion occurs and pushes the interior ring forward, to keep a seal over the combustion chamber (e.g., the combustion chamber 118).

Figure 9:
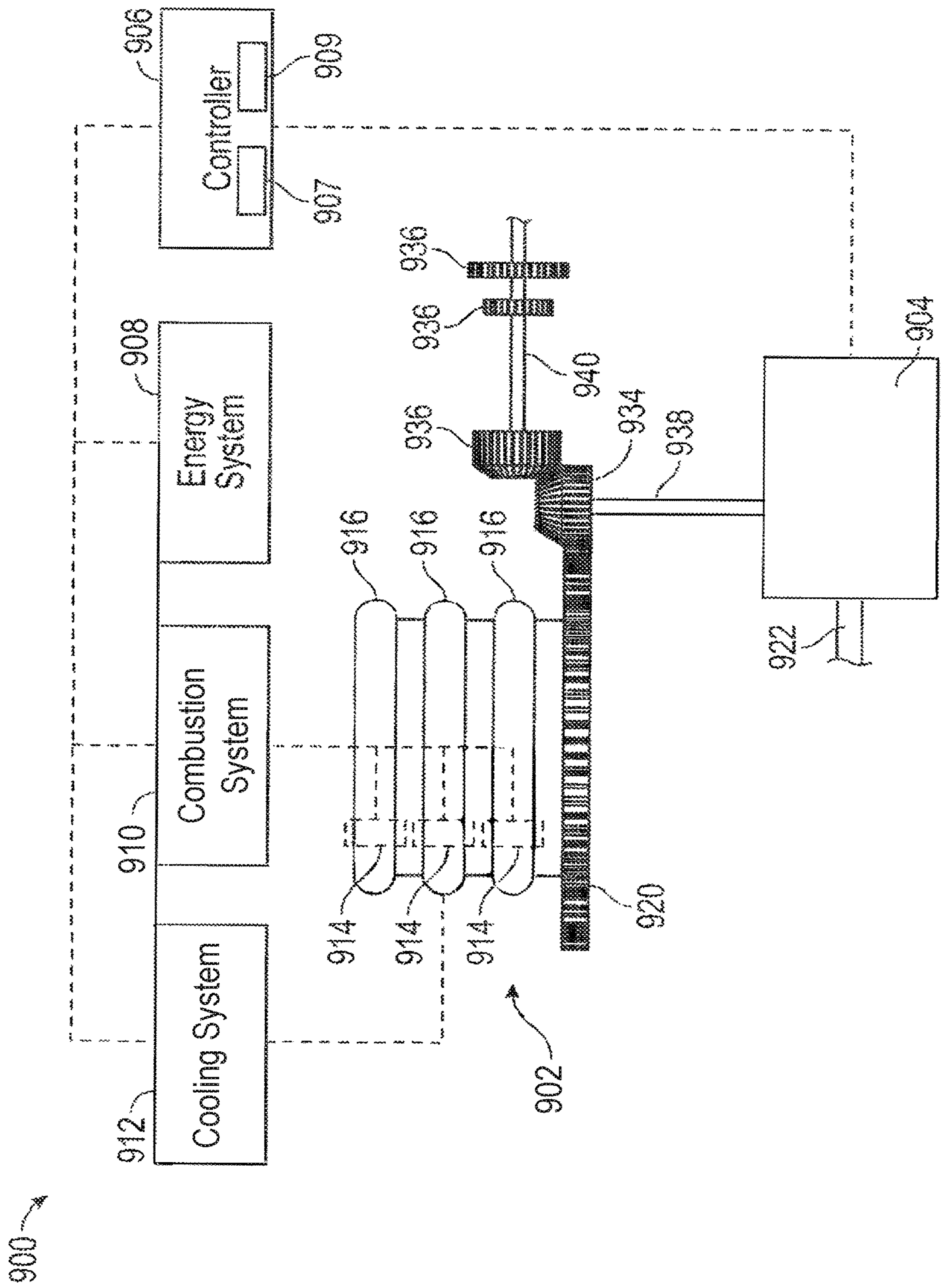
FIG. 9 is a schematic view of a rotational engine system, according to an exemplary embodiment.

Referring now to FIG. 9, a rotational engine system 900 is shown, according to an exemplary embodiment. The rotational engine system 900 includes a stacked rotational engine 902, a gear box 904, a controller 906, an energy system 908, a propulsion or combustion system 910, and a cooling system 912. The stacked rotational engine 902 functions substantially similarly to the rotational engine 100 described above. Accordingly, it will be understood that various aspects of the description of the rotational engine 100 provided above may be applied to the stacked rotational engine 902. As such, the following description of the stacked rotational engine 902 will be directed toward the difference between the stacked rotational engine 902 and the rotational engine 100.

The rotational engine system 900 includes a plurality of combustion components 914, a plurality of outer ring enclosures 916, a plurality of inner ring components 918 (shown in FIG. 10), and a drive gear 920. The plurality of combustion components 914 may be substantially similar in configuration and function to the combustion components 102 described above. As shown in FIG. 9, in some embodiments, a combustion component 914 may be coupled to a radially-inner surface of each of the plurality of outer ring enclosures 916. However, it will be appreciated that in other embodiments, the plurality of combustion components 914 may be arranged differently. For example, in some embodiments, a plurality of combustion components 914 may be coupled to each of the plurality of outer ring enclosure 916 (e.g., staggered circumferentially around the toroidal shape of the corresponding outer ring enclosure 916 or circumferentially around the cross section of the outer ring enclosure). In some embodiments, the combustion components 914 may each be coupled to the radially-inner surface of each of the plurality of outer ring enclosures 916 at the same circumferential position (i.e., as shown in FIG. 9).

Figure 10:
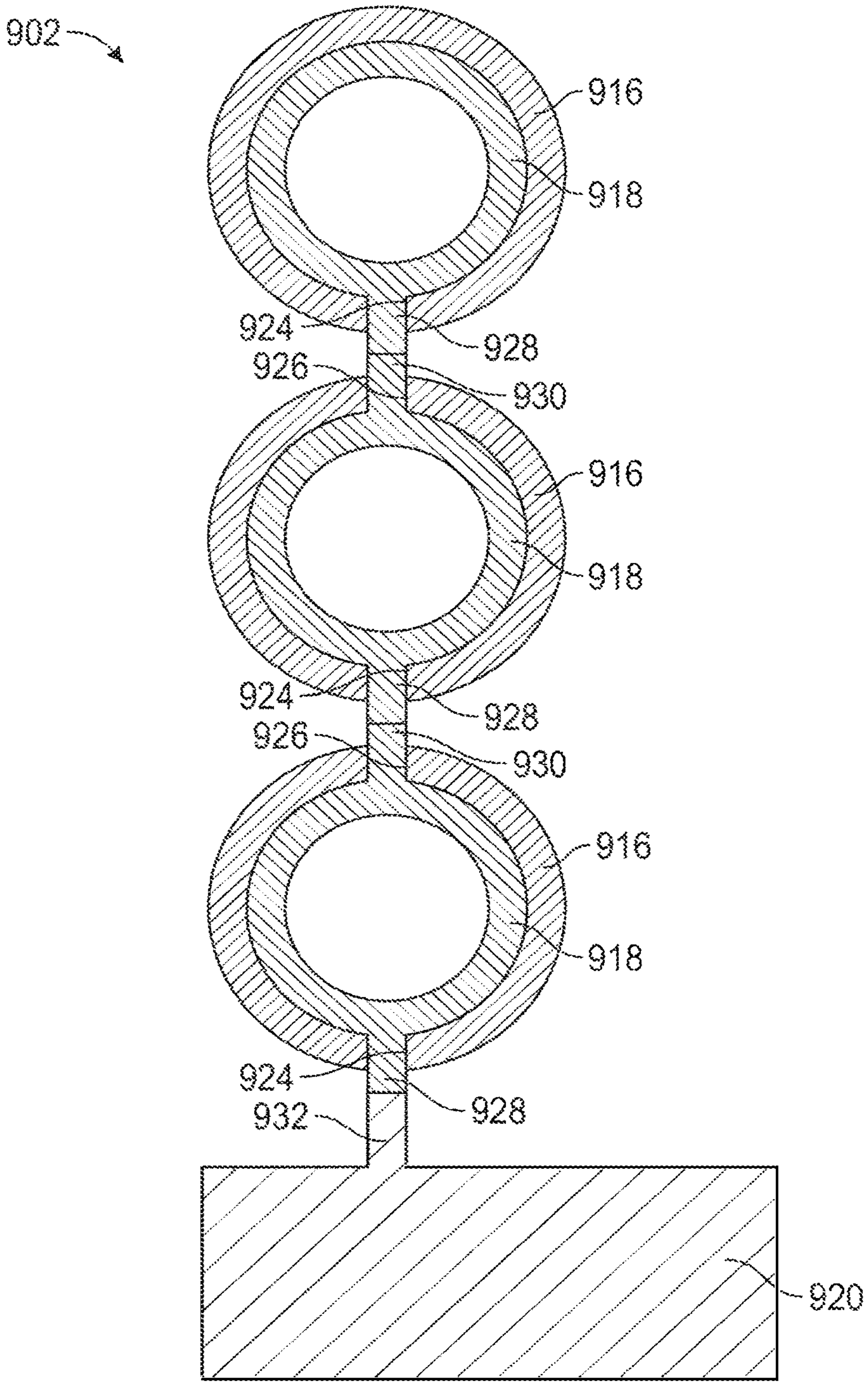
FIG. 10 is a cross-sectional view of a stacked rotational engine of the rotational engine system of FIG. 9, according to an exemplary embodiment.

As best shown in FIG. 10, the outer ring enclosures 916 are substantially similar to the outer ring enclosure 104 discussed above. For example, the outer ring enclosures 916 may similarly define generally circular cross section profiles. However, in the stacked configuration, each intermediate outer ring enclosure 916 between the drive gear 920 and a top outer ring enclosure 916 includes both a lower inner ring drive channel 924 and an upper inner ring drive channel 926. The lower ring drive channel 924 and the upper inner ring drive channel 926 are each similarly configured to allow for a corresponding inner ring component 918 to engage either the drive gear 920 or another inner ring component 918, as will be further discussed below. Each of the lower inner ring drive channel 924 and the upper inner ring drive channel 926 may be shaped, sized, and configured to function substantially similarly to the inner ring drive channel 124 discussed above.

The inner ring components 918 are substantially similar to the inner ring components 106 discussed above. For example, the inner ring components 918 may similarly comprise a plurality of combustion chambers, similar to the combustion chambers 118 discussed above. The inner ring components 918 may similarly define generally circular cross section profiles and be configured to fit and rotate within corresponding outer ring enclosures 916. However, similar to the outer ring enclosures 916, each inner ring component 918 between the drive gear 920 and a top inner ring component 918 includes both a lower engagement section 928 and an upper engagement section 930. The lower engagement section 928 and the upper engagement section 930 are each similarly configured to engage one of a lower engagement section 928 or an upper engagement section 930 of another inner ring component 918 or an inner ring engagement section 932 of the drive gear 920. Each of the lower engagement section 928 and the upper engagement section 930 may be shaped, sized, and configured to function substantially similarly to the drive gear engagement section 146 discussed above.

Accordingly, the various inner ring components 918 are configured to individually (e.g., the bottom inner ring component 918) and/or collectively drive the drive gear 920 in a similar manner to the inner ring component 106 driving the drive gear 108, discussed above.

The controller 906 is configured to control operation of the rotational engine system 900. The controller includes a memory 907 and a processor 909. The memory 907 may contain one or more programs or instructions for execution by the processor 909. The controller 906 is further operatively coupled to the gear box 904, the energy system 908, the combustion system 910, and the cooling system 912. The controller 906 may be configured to control the rotational engine system 900 (or the rotational engine 100) in accordance with any of the methods described herein, with reference to either the rotational engine 100 or the rotational engine system 900. It should additionally be appreciated that any of the various other systems (e.g., the energy system 908, the combustion system 910, and/or the cooling system 912) may be utilized with the rotational engine 100 described above.

The energy system 908 is configured to provide energy (e.g., electrical energy, hydraulic energy, pneumatic energy) to power the various components of the rotational engine system 900. In some instances, the energy system 908 may comprise a battery configured to provide electrical power to the stacked rotational engine 902. For example, in some embodiments, the engine may be powered by a battery for embodiments where the engine uses electric arc or magnetic pressure as the propulsion method. The engine may both power the drive mechanism for the vehicle and a generator which supplies power back to the battery or directly to the engine. The battery may be rechargeable. In some instances, the energy system 908 may additionally include the generator configured to receive a rotational output 922 of the gear box 904 (as depicted by the dashed line between the rotational output 922 and the energy system 908) and to turn that rotational output into electrical energy to be stored and utilized to power the rotational engine system 900 (e.g., via the battery).

The gear box 904 is configured to receive rotational energy from the drive gear 920 and to provide variable output power and speed via the rotational output 922 of the gear box 904. For example, in some embodiments, the gear box 904 includes a variety of gears of differing sizes (e.g., between 1 inch and 12 inches inclusively or any other suitable gear sizing). The various gears may be selectively engageable via control signals received from the controller 906 (e.g., an automatic transmission) or via a manual transmission-type input from a user.

For example, the gears of the gear box 904 are configured to selectively engage one another to provide a variety of gear ratios (e.g., a variable gear ratio), thereby allowing for the gear box 904 to convert a rotational power from of the stacked rotational engine 902 having an initial torque at an initial speed to a higher torque with a lower speed or a lower torque with a higher speed. In some instances, the gear box 904 is configured to allow for multiple variations of output power and speed (e.g., utilizing 3, 4, 5, 6, 7, 8, or more levels of selectively engageable vertical and/or horizontal gears of differing diameters).

As illustrated in FIG. 9, in some embodiments, the gear box 904 is configured to receive rotational energy from the drive gear 920 indirectly via one or more vertical gears 934, horizontal gears 936, vertical gear rods 938, and/or horizontal gear rods 940. For example, in some instances, the drive gear 920 is configured to drive a vertical gear 934 that is fixedly coupled to a vertical gear rod 938, which then supplies rotational power to the gear box 904. In these instances, the vertical gear 934 may include a spur gear portion. In some other embodiments, the gear box 904 may instead receive rotational energy directly from the drive gear 920 via a direct geared connection. Accordingly, in some instances, the rotational engine system 900 may include a variety of gears for transmitting rotational power to various components located about the stacked rotational engine 902 (e.g., above, below, next to the stacked rotational engine 902).

In some instances, a vertical gear 934 driven by the drive gear 920 may be configured to drive a horizontal gear 936. In these instances, the vertical gear 934 and the horizontal gear 936 may each additionally or alternatively include a bevel gear portion to allow for the change in direction of the rotational energy (e.g., from the vertical direction to the horizontal direction). In some instances, bevel gear portions may be utilized that enable the axis of the rotational energy to be changed by varying angels (e.g., between zero degrees and one hundred and eighty degrees). The horizontal gear 936 may then be fixedly coupled to a horizontal gear rod 940 to drive a variety of other horizontal gears 936 and/or other systems generally (e.g., a drive system, a propeller, or a generator). For example, in some instances, the energy system 908 may receive rotational energy from the stacked rotational engine 902 via a direct geared arrangement.

In some instances, any of the vertical gear rods 938 and/or the horizontal gear rods 940 may have thin cross sections and/or may be short with respect to the corresponding vertical gears 934 and/or horizontal gears 936 to reduce momentum-related drag in the system. For example, in some embodiments, the rods may define thicknesses of between a half inch and three inches. Similarly, in some instances, the drive gear 920 may have a thin thickness (vertically with respect to FIG. 9) to reduce momentum-related drag when it is rotationally accelerated by the stacked rotational engine 902. For example, in some instances, the drive gear 920 (or the drive gear 108) may define a thickness of between a half inch and three inches. In some other embodiments, the rods 938, 940 and/or the drive gear 920 (or the drive gear 108) may define thicknesses that are larger or smaller for a given application.

It should be appreciated that there may be a variety of arrangements of vertical gears 934, horizontal gears 936, vertical gear rods 938 and/or horizontal gear rods 940 that may be utilized to achieve varying power outputs to the gear box 904 and/or to other systems generally. Similarly, any of the vertical gears 934 and/or the horizontal gears 936 may have varying sizes, such as, for example, between 1 inch and 12 inches inclusively or any other suitable gear sizing. Further, any of the vertical gears 934 and/or horizontal gears 936 may include spur and/or bevel portions to allow for a variety of arrangements to be created.

In some instances, the rotational engine system 900 may be configured to provide rotational power about an axis that is aligned with or offset from a central axis of the stacked rotational engine 902 or about any other desired axis. Further, various gears in the rotational engine system 900 may be selectively engaged or disengaged with various other gears in the rotational engine system 900 using the controller 906 to provide varying levels of rotational power to different components for a given application. In some instances, the controller 906 may be configured to selectively disengage the drive gear 920 from all other gears in the system to conserve rotational energy within the stacked rotational engine 902.

In some instances, the various gears of the rotational engine system 900 may additionally be configured to continue to spin when not engaged by other gears to reduce power spiking when they are reengaged. For example, in some instances, various gears may spin at approximately the same speed when disengaged as the drive gear 920 to reduce the power spike when they are reengaged.

The combustion system 910 is configured to provide fuel (e.g., gasoline, liquid oxygen, liquid hydrogen, and/or other liquid or gas fuels) and ignition (e.g., an electrical spark, a controlled electrical arc explosion, a controlled magnetic pressure explosion) to and pull exhaust from the various combustion chambers (e.g., similar to the combustion chambers 118) of the inner ring components 918 via the combustion components 914 to effectively deliver combustive power to the stacked rotational engine 902. The cooling system 912 is configured to supply cooling fluid and/or lubricant to the various components of the stacked rotational engine 902 during operation.

Accordingly, during operation the controller 906 may be configured to control the energy system 908, the combustion system 910, and the cooling system 912 to control operation of the rotational engine system 900. For example, the controller 906 is configured to control the energy system 908 to provide energy (e.g., electrical power) to the combustion system 910. The controller 906 is further configured to deliver combustive power to various combustion chambers (e.g., similar to the combustion chambers 118 discussed above) within the inner ring components 918 via the combustion components 914 to drive the inner ring components 918 rotationally within the corresponding outer ring enclosures 916. The controller 906 is further configured to control the cooling system 912 to deliver cooling fluid and/or lubricant to the various components of the stacked rotational engine 902 during operation to prevent the stacked rotational engine 902 from overheating.

It should be appreciated that, although the stacked rotational engine 902 is shown including three ring arrangements (i.e., three outer ring enclosures 916 and three corresponding inner ring components 918), more or less ring arrangements may be utilized as necessary for a given application. For example, in some embodiments, as few as one ring arrangement may be utilized (e.g., as utilized in the rotational engine 100 described above). In other embodiments, there may be as many ring arrangements as desired (e.g., 2, 3, 4, 5, 6, 7, 8, 9, 10, etc.) to provide additional output power for a given application (e.g., more ring arrangements allow for more output power).

Figure 11:
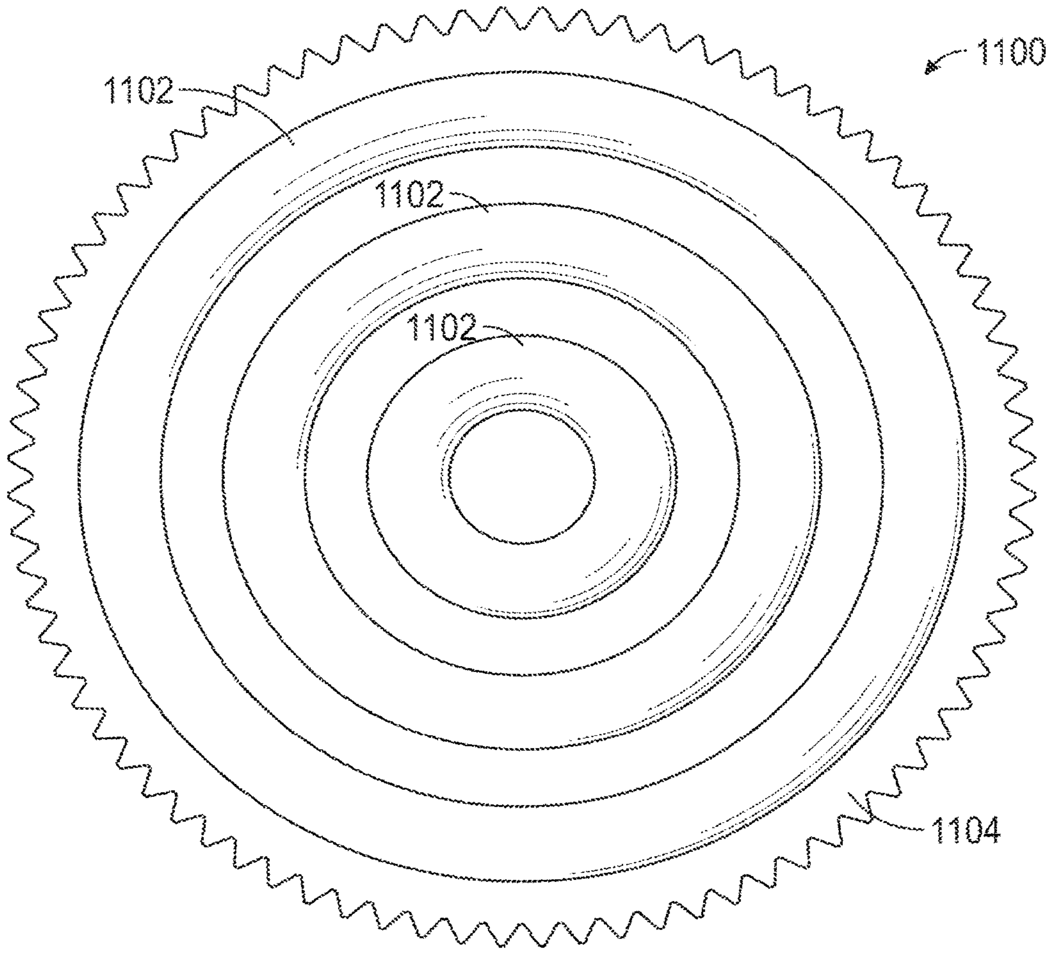
FIG. 11 is a top view of a nested rotational engine configured for use with the rotational engine system of FIG. 9, according to an exemplary embodiment.

Further, as shown in FIG. 11, in some embodiments, a nested rotational engine 1100 (e.g. similar to the rotational engine 902 and/or the rotational engine 100) may include multiple nested ring arrangements 1102 (e.g., each including outer ring enclosures and corresponding inner ring components) configured to function similarly to the ring arrangements discussed above (i.e., the outer ring enclosures 104, 916 and corresponding inner ring components 106, 918). For example, a first ring arrangement may have a first diameter with respect to the large, outer, circular shape formed by the outer ring enclosure (i.e., not the cross section diameter). A second ring arrangement may then have a second diameter that is sufficiently smaller than the first diameter so as to allow for the second ring arrangement to fit radially within the first ring arrangement.

Although the nested rotational engine 1100 includes three nested ring arrangements 1102 configured to drive a single drive gear 1104, in some embodiments, any number of ring arrangements (e.g., 2, 3, 4, 5, 6, 7, 8, 9, 10, or more) may be nested radially within each other and configured to engage and rotate a single drive gear (or in some instances multiple drive gears), thereby increasing a power output (e.g., horsepower) of the rotational engine 1100. In some embodiments, nested ring arrangements may additionally or alternatively be linked via engagement portions similar to the engagement sections 928, 930 discussed above. It will be appreciated that the rotational engine 1100 may be utilized in place of or in addition to the stacked rotational engine 902 in the rotational engine system 900.

Further, in some embodiments, the stacked and nested arrangements may be combined to provide even higher power output. For example, each stacked ring configuration may include multiple nested ring arrangements, and each nested ring arrangement may be aligned with a corresponding ring arrangement above and/or below, and linked via engagements portions (e.g., similar to the engagement sections 928, 930 discussed above), to collectively drive a single drive gear (similar to the drive gear 920).

Further, although the ring arrangements of the rotational engines discussed herein define circular cross sections, in some embodiments, various other shaped cross sections may be utilized in various other rotational engines within the scope of the present disclosure. For example, in some instances, the ring arrangements may define oval, rectangle, triangle, square, or other shaped cross sections. In some embodiments, the ring arrangement cross sections may be designed to minimize an overall thickness of a stacked configuration (e.g., similar to the stacked rotational engine 902) or to minimize an overall width of a nested configuration (e.g., similar to the nested rotational engine 1100).

For example, in some embodiments, an oval or rectangle shaped cross section may be utilized for the various ring components, such that the smaller diameter or length may be oriented based on minimizing the overall height of a stacked configuration or the overall width of a nested configuration. Specifically, in a stacked configuration, the smaller diameter of the oval shape or the smaller width of the rectangle shape may be oriented in the vertical direction, such that the overall height of the stacked rotational engine is minimized. On the other hand, in a nested configuration, the smaller diameter of the oval shape or the smaller width of the rectangular shape may be oriented in the horizontal direction, such that the overall width of the nested rotational engine is minimized. In some cases, the larger diameter of the oval shape or the larger width of the rectangle shape may be between two and ten times larger than the smaller diameter of the overall shape or the smaller width of the rectangle shape.

Additionally, in some embodiments, the controller 906 may be configured to selectively engage and disengage the various inner ring components 918 from each other (e.g., utilizing various clutch mechanisms) to allow for varying numbers of inner ring components 918 to drive the drive gear 920 to achieve different levels of power output.

While not specifically shown in the FIGURES, various other modifications to the rotational engine 100 and/or the rotational engine system 900 may be made to increase efficiency and/or power output. For example, in some instances, the rotational engine system 900 may utilize multiple rotational engines (e.g., similar to the rotational engine 100 and/or the stacked rotational engine 902), and the output of each rotational engine may be combined using various gearing techniques to provide additional rotational power and flexibility for a given application.

Figure 12:
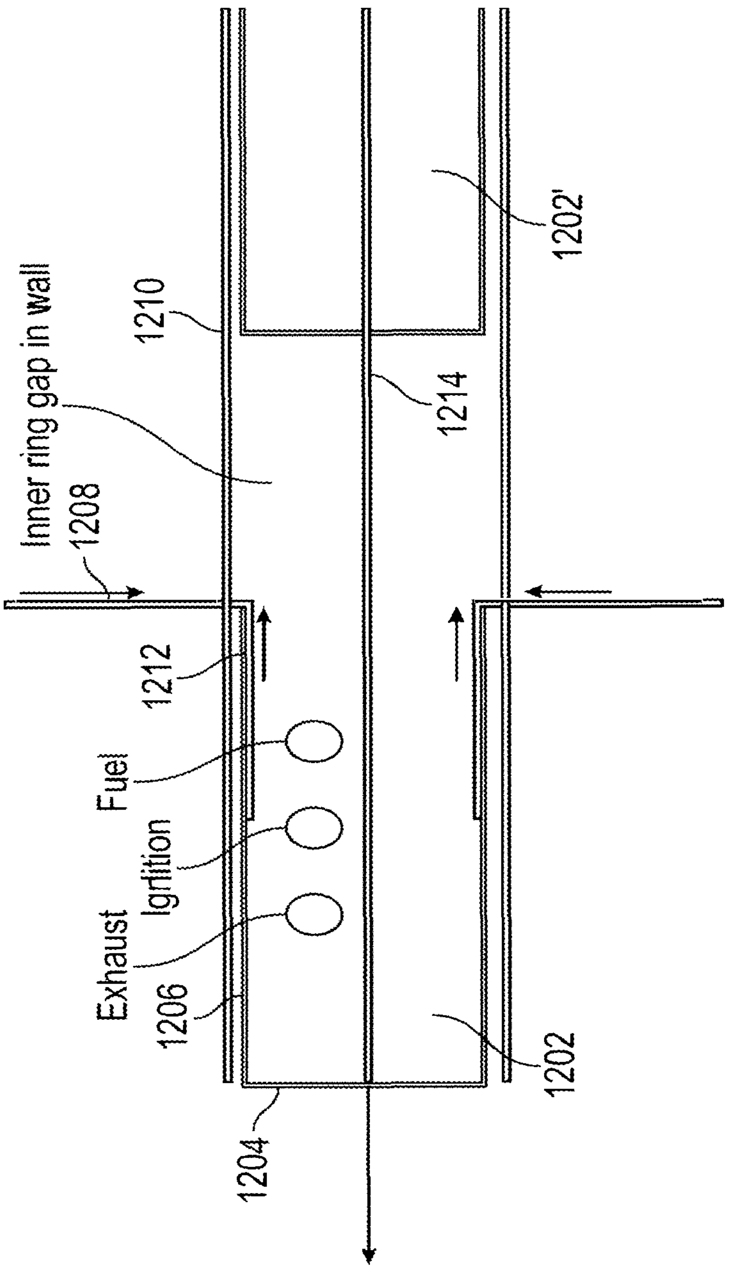
FIGS. 12-17 are a cross-sectional views of a combustion chamber of the rotational engine of FIG. 1, according to an exemplary embodiment.
Figure 13:
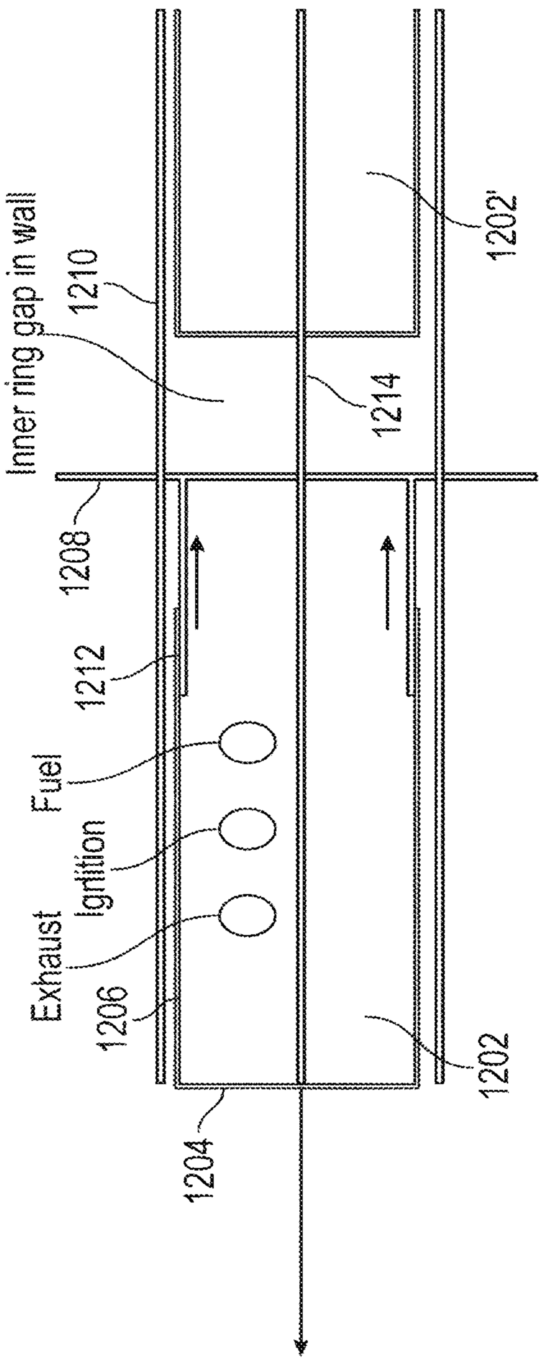

Referring now to FIGS. 12-15, additional cross-sectional views of a combustion chamber (e.g., combustion chambers 118) of rotational engine 100 are shown, according to exemplary embodiments. Turning first to FIGS. 12 and 13, a combustion chamber 1202, which may be the same as or similar to combustion chambers 118, can include a fixed front wall 1204 (e.g., at a front end of the combustion chamber 1202). The front wall 1204 can be fixed to an inner ring 1206 (e.g., similar to or the same as inner ring components 106, 918) and to a gate 1208 to form an enclosure. In some embodiments, the gate 1208 is secured to an outer ring enclosure 1210 (e.g., similar to or the same as outer ring enclosures 104, 916) such that combustion forces push against the gate 1208, thereby pushing the inner ring 1206 around the outer ring enclosure 1210 in the direction opposite of the gate 1208.

In some embodiments, there is an opening (i.e., gap) behind the gate 1208 in walls 1212 of the inner ring 1206 such that combustion forces pushing against the gate 1208 move the inner ring 1206 in a direction opposite the gate 1218. The gate 1208 may have an opening where a connector 1214 from the inner ring 1206 connects two inner ring combustion chambers (e.g., combustion chambers 1202 and 1202') on either side of the gate 1208. In some embodiments, the gate 1208 is formed in two halves one or more spaces configured to receive the inner ring connector 1214. In some such embodiments, these spaces may be at the center of the gate 1208 and the two halves of the gate 1208 may be inserted (e.g., during manufacturing) into the inner ring 1206 from opposite sides of the outer ring enclosure 1210, and can then be connected within the inner ring 1206 to form the gate 1208. In some embodiments, the walls 1212 of the inner ring 1206 (e.g., around the circumference of the inner ring 1206 and in front of the gate 1208), which are shown in FIG. 12 in a retracted position, may expand and extend as the combustion occurs, as shown in FIG. 13, thereby pushing the inner ring 1206 forward to keep a seal over the combustion chamber 1202.

Figure 14:
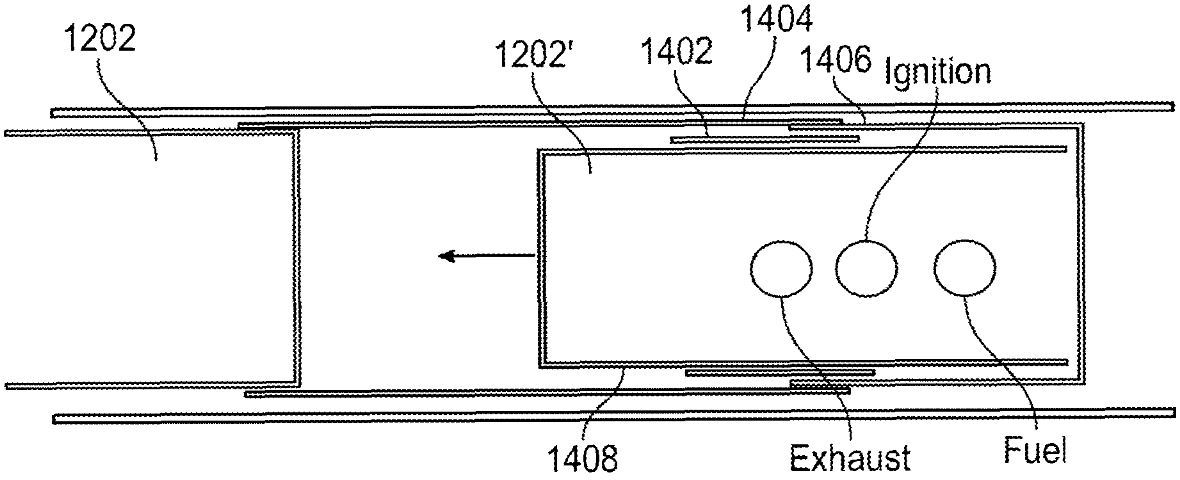
Figure 15:
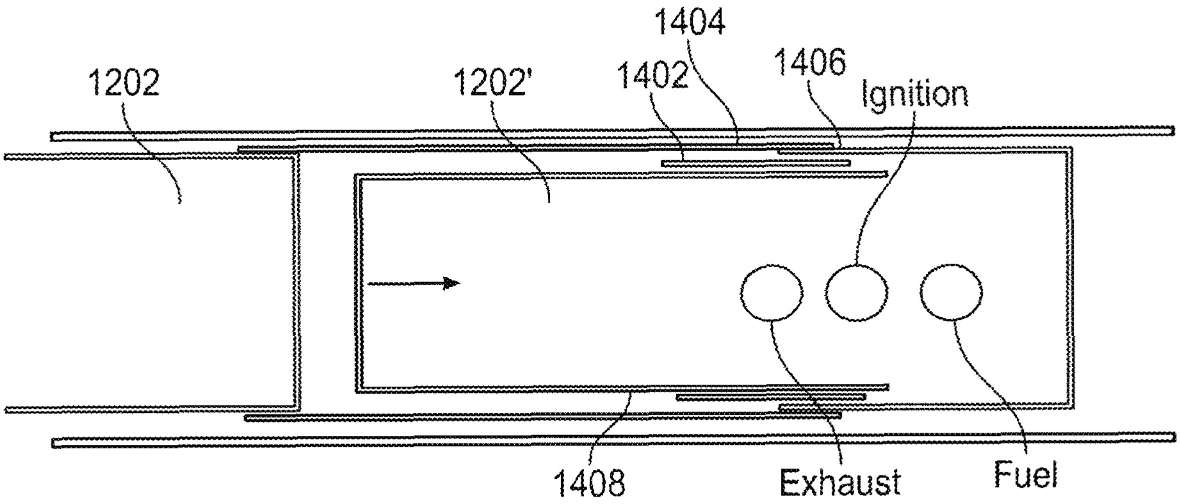

Turning now to FIGS. 14 and 15, the combustion chamber 1202 is shown as two pieces (e.g. two halves), shown as 1202 and 1202'. In some embodiments, one half of the combustion chamber 1202 can move in a longitudinal direction along an inner ring 1404 to extend from a starting position, which is illustrated by the arrow on combustion chamber 1202'. In some embodiments, a spring or other component (not shown) can provide resistance to the moving half of the combustion chamber 1202). In such embodiments, the spring or other device is coupled to two or more sides of the inner ring 1404, shown as stationary side 1406 and movable side 1408; however, only one side (e.g., movable side 1408) may be configured to extend. In particular, combustion forces can push against movable side 1408, thereby applying a force to the spring or other component which pushes the inner ring 1404 around an outer ring enclosure 1410.

Once extended, the spring or other component may decouple from the extended movable side 1408 of inner ring 1404 and may reset in a position where it is not attached to inner ring 1404. Accordingly, in some embodiments, the extended movable side 1408 may mechanically return to a starting position and, once in the starting position, the spring or other component can be recoupled to the movable side 1408. The inner ring 1404 may thus be formed around the movable side 1408 without contacting the movable side 1408, such that the stationary side 1406 of inner ring 1404 is connected to the inner ring structure and can stay stationary during combustion.

Figure 16:
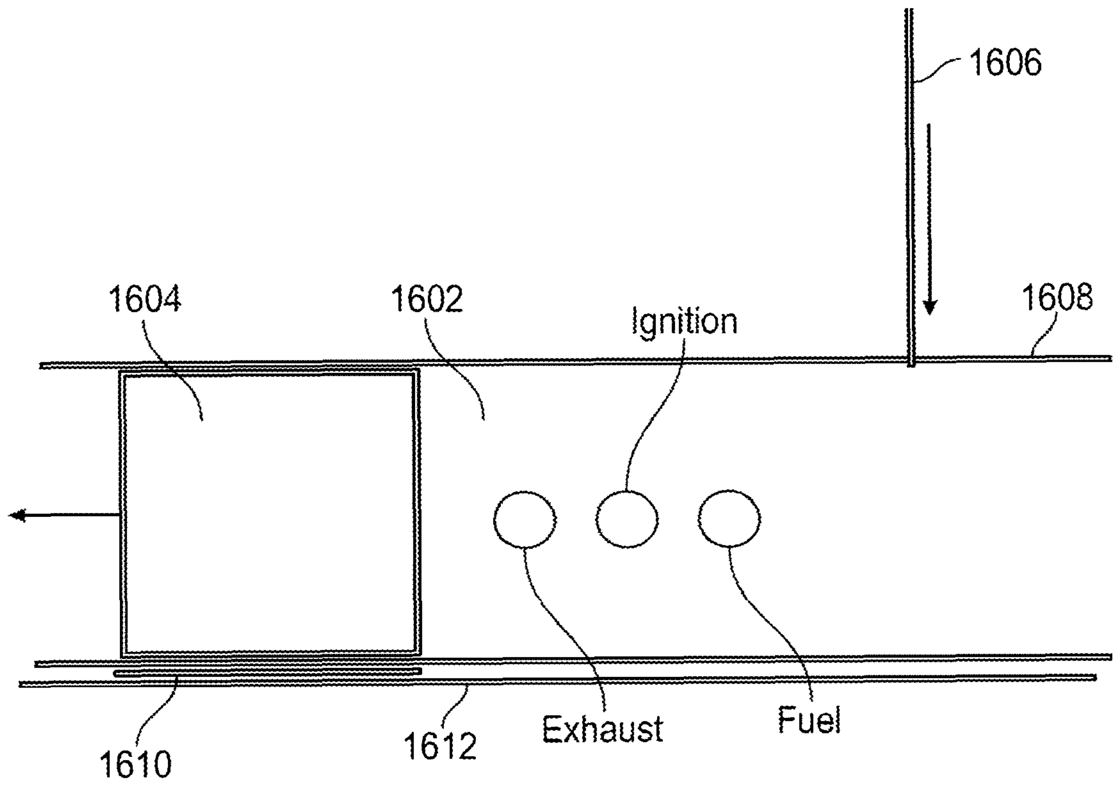
Figure 17:
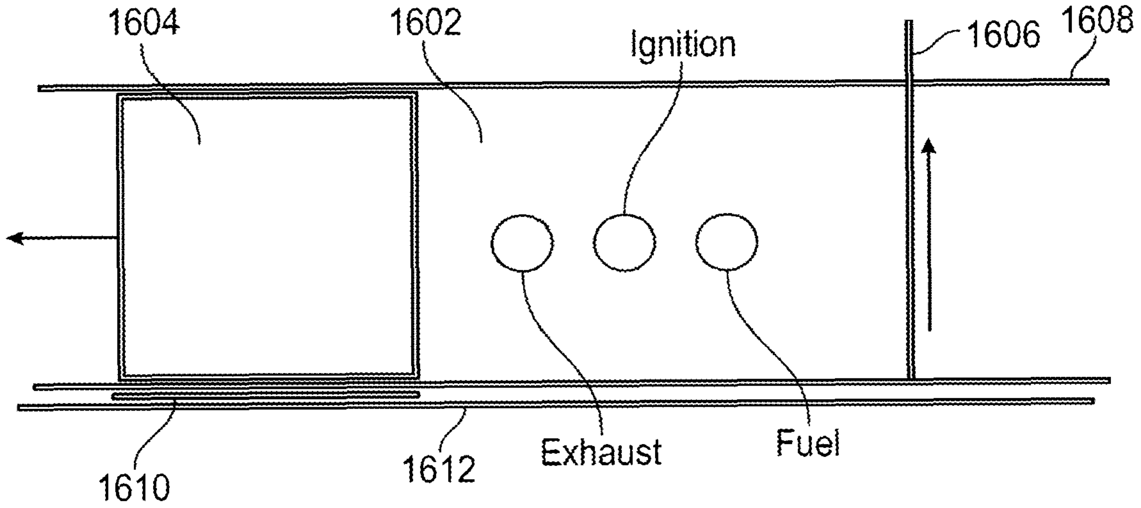

In some embodiments, as shown in FIGS. 16 and 17, a combustion chamber 1602 is formed within an outer ring enclosure 1608 between an inner ring portion 1604 and a gate 1606 (e.g., rather than an internal combustion chamber formed inside an inner ring). In some such embodiments, the inner ring portion 1604 is formed as combustion forces (e.g., formed by one or more pistons) push the inner ring portion 1604 around an outer ring enclosure 1608. The inner ring portion 1604 may define a portion of the interior of the outer ring enclosure 1608 and, as shown, can fit within the outer ring enclosure 1608 such that there is little to no clearance between the outer ring enclosure 1608 and the walls of the inner ring portion 1604. In some embodiments, a plurality of inner ring portions (e.g., multiple of inner ring portion 1604) may be positioned such that there is a space between each of the plurality of inner ring portions to allow for exhaust, ignition, and fuel ports, and to allow for the formation of gate 1606.

In some embodiments, a plurality of inner ring portions are connected by a bottom drive gear 1612, such that the plurality of inner ring portions move together. In some embodiments, the gate 1606 is secured to the outer ring enclosure 1608, as shown in FIG. 17, to temporarily form a wall behind the exhaust, ignition, and fuel ports and the plurality of inner ring portions, allowing for combustion forces to push the plurality of inner ring portions around the outer ring enclosure 1608. In such embodiments, the spacing between the plurality of inner ring portions allows the gate 1606 to freely (i.e., without blockage) change positions relative to the plurality of inner ring portions (e.g., during movement or operation). The gate 1606 may retract, as shown in FIG. 16, to be at least partially removed from the outer ring enclosure 1608 before a subsequent inner ring portion (e.g., inner ring portion 1604) moves in a position in proximity to the gate (e.g., as the plurality of inner ring portions move). The gate 1606 can then be extended between the subsequent inner ring portion and any following inner ring portions.

Figure 18:
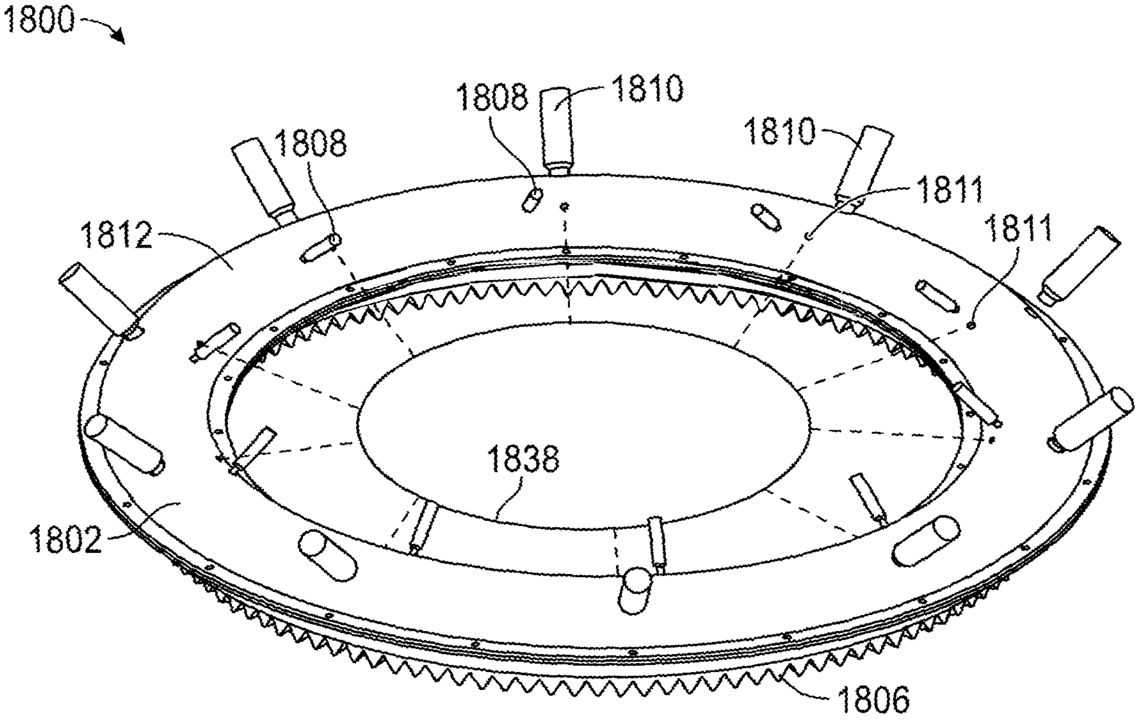
FIG. 18 is a front, upper perspective view of a rotational engine, according to an exemplary embodiment.

Referring now to FIG. 18, another rotational engine 1800 is shown, according to one example embodiment. The rotational engine 1800 includes an outer ring assembly 1802, an inner ring assembly 1804 (shown in FIGS. 20 and 21), a drive gear 1806, one or more ignition ports 1808, one or more exhaust ports 1810. As a general overview, in some embodiments, a controller (e.g., similar to the controller 906 described in FIG. 9) may be configured to control a propulsion or combustion system (e.g., similar to the propulsion or combustion system 910 described in FIG. 9) to deliver combustive power (e.g., fuel, ignition) and pull exhaust via the one or more ignition ports 1808, the one or more exhaust ports 1810, and one or more fuel ports 1811 to and from the rotational engine 1800, which may ultimately be used to rotate the drive gear 1806, as will be described below.

Figure 19:
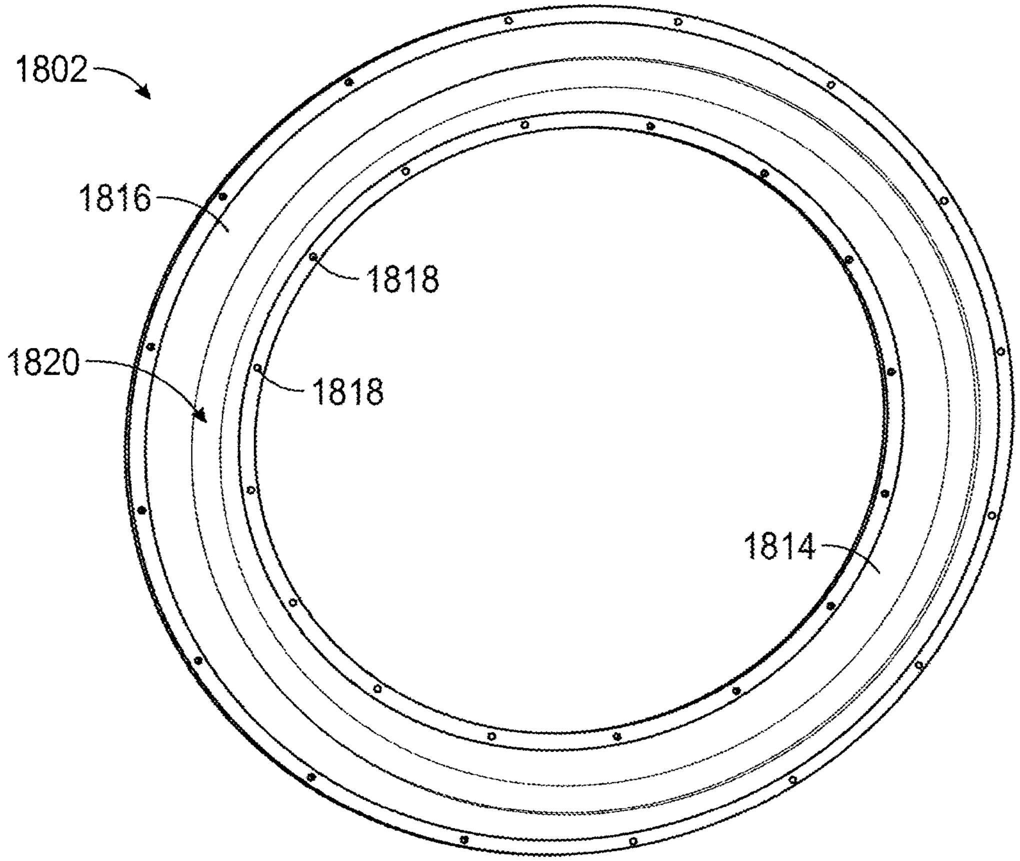
FIG. 19 is a bottom view of an outer ring assembly of the rotational engine of FIG. 18, according to an exemplary embodiment.

As depicted in FIGS. 18 and 19, the outer ring assembly 1802 comprises an upper component 1812 (shown in FIG. 18) coupled to a radially-inner bottom component 1814 (shown in FIG. 19) and a radially-outer bottom component 1816 (shown in FIG. 19). In some embodiments, the upper component 1812 may be coupled to the radially-inner bottom component 1814 and the radially-outer bottom component 1816 via one or more fasteners (e.g., through one or more corresponding fastener apertures 1818). In some other embodiments, the upper component 1812 may be coupled to the radially-inner bottom component 1814 and the radially-outer bottom component 1816 via other coupling methods, such as, for example, welding, crimping, adhesives, etc.

As shown in FIG. 19, when assembled, the radially-inner bottom component 1814 and the radially-outer bottom component 1816 are configured to collectively define a drive gear channel 1820 between the radially-inner bottom component 1814 and the radially-outer bottom component 1816 that extends circumferentially about and through a bottom surface of the outer ring assembly 1802. The drive gear channel 1820 is configured to receive and allow the drive gear 1806 to extend from the inner ring assembly 1804 out of the bottom of the outer ring assembly 1802.

Figure 20:
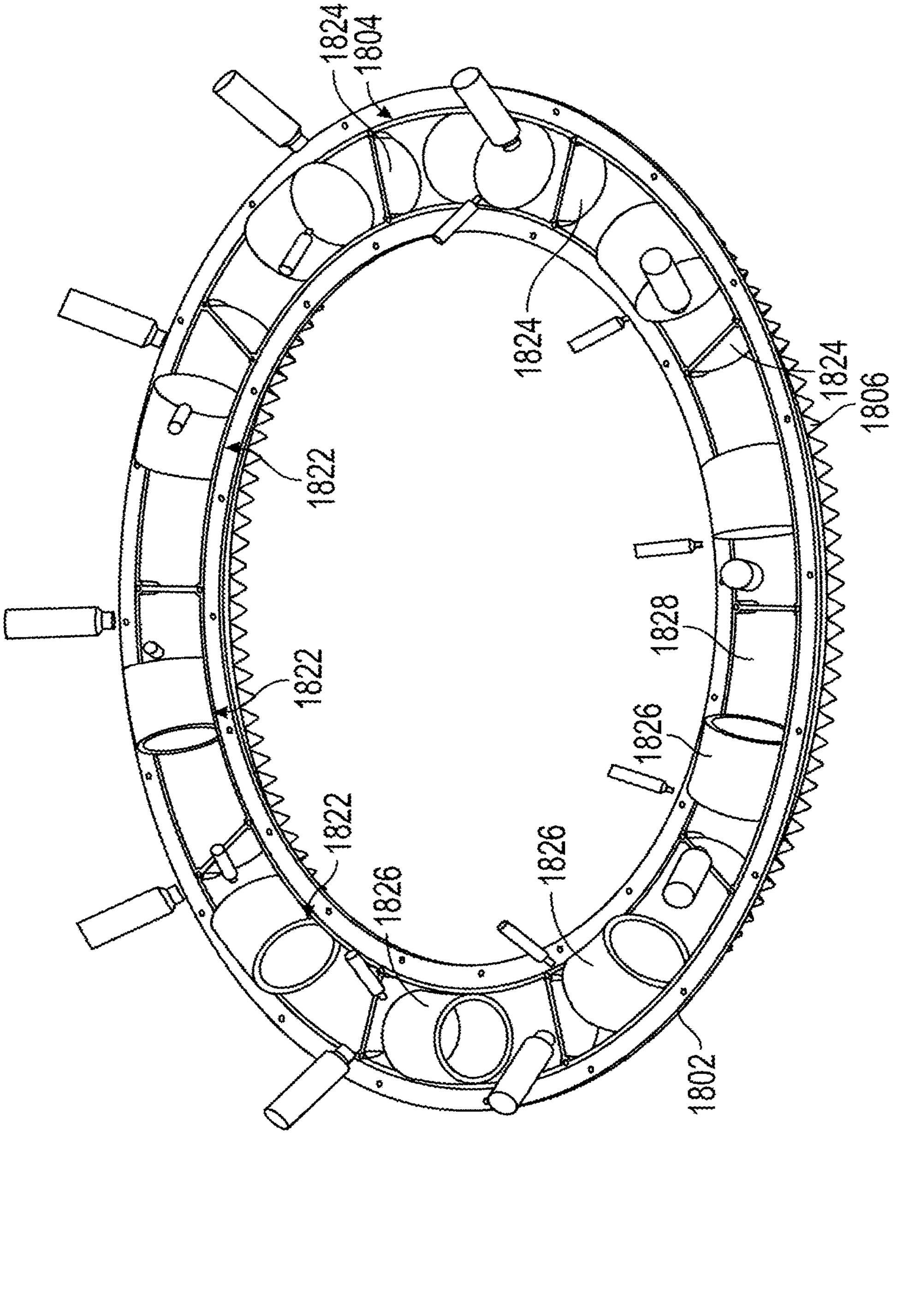
FIG. 20 is a partial cross-sectional perspective view of the rotational engine of FIG. 18, according to an exemplary embodiment.

Referring now to FIG. 20, the inner ring assembly 1804 defines a generally annular shape and is rigidly coupled to the drive gear 1806 at a bottom surface of the inner ring assembly 1804. The inner ring assembly 1804 is configured to rotate within the outer ring assembly 1802 during operation to drive the drive gear 1806, which is rigidly fixed to a bottom surface of the inner ring assembly 1804. Accordingly, the rotational engine 1800 may include various lubrication and/or bearing systems to allow for rotation of the inner ring assembly 1804 within the outer ring assembly 1802.

The inner ring assembly 1804 includes one or more combustion chambers 1822 separated by corresponding combustion chamber walls 1824. Each combustion chamber 1822 further includes a corresponding piston 1826. It should be appreciated that the illustrated inner ring assembly 1804 shown in FIGS. 20 and 21 is a partial cross-sectional view, and that each of the combustion chambers 1822 forms a complete, curved tube (i.e., a radially-outer wall 1828 forms an outer tubular surface around the piston 1826), such that the plurality of combustion chambers 1822 collectively form a circular tube shape defined by the inner ring assembly 1804.

Figure 21:
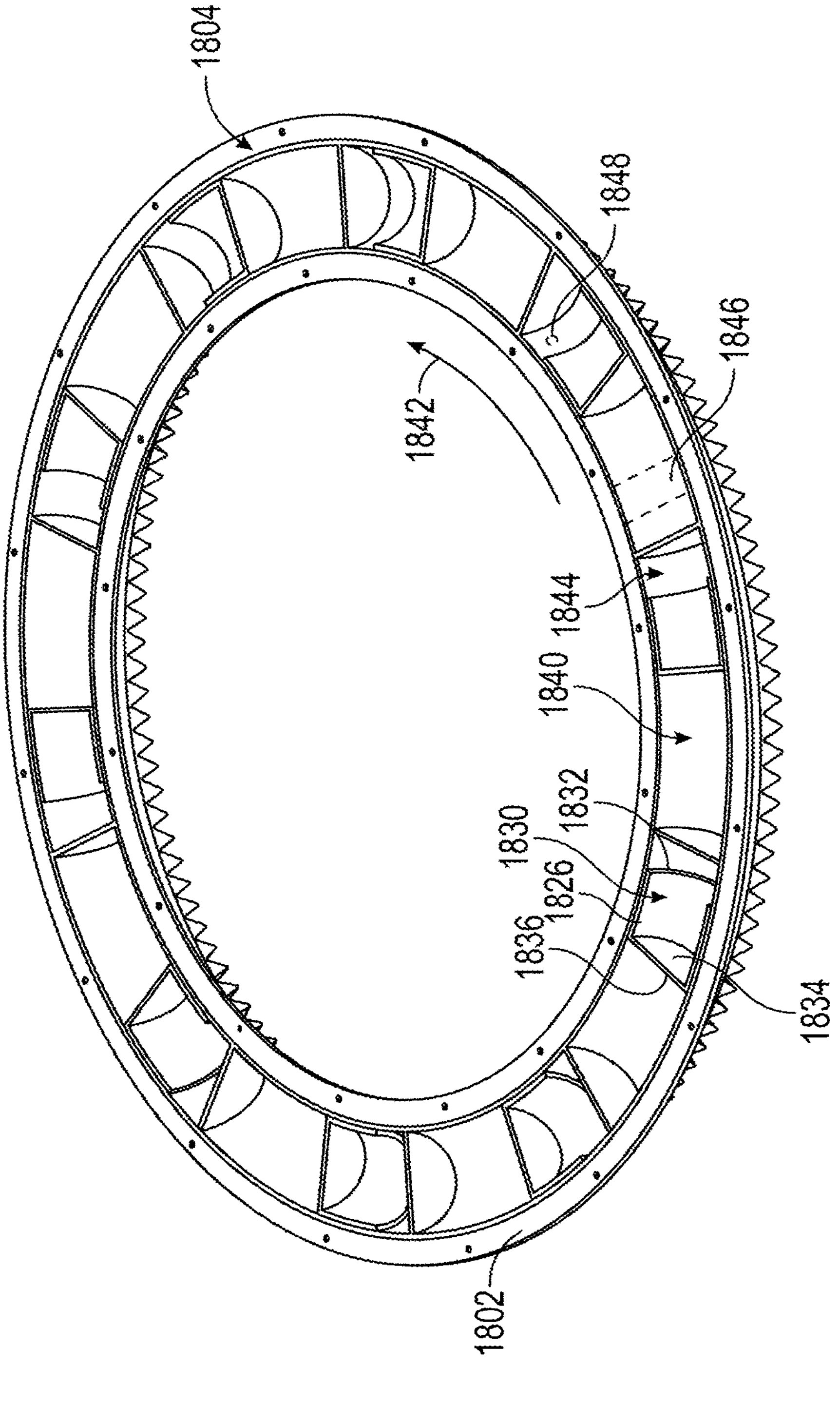
FIG. 21 is another partial cross-sectional perspective view of the rotational engine of FIG. 18.

As depicted in FIGS. 20 and 21, each piston 1826 defines a generally cylindrical shape that is substantially hollow. Specifically, with reference to FIG. 21, each piston 1826 includes a leading piston cavity 1830 extending into a leading end 1832 of the piston 1826. Each piston 1826 further includes a trailing piston wall 1834 at a trailing end 1836 of the piston 1826.

With reference again to FIGS. 18, 20, and 21, during operation, fuel is delivered from a fuel delivery system 1838 into one or more combustion areas 1840 (shown in FIG. 21) within corresponding combustion chambers 1822 via the one or more fuel ports 1811. Apertures associated with the one or more fuel ports 1811 extend through the outer ring assembly 1802 (e.g., the upper component 1812) and align with corresponding fuel openings formed in the radially-outer wall 1828 of the inner ring assembly 1804 to allow for the fuel to pass into the corresponding combustion areas 1840. The combustion areas 1840 are located between the trailing piston wall 1834 and a trailing combustion chamber wall 1824 (i.e., the combustion chamber wall 1824 that is behind the piston 1826 with respect to a drive direction 1842 of the rotational engine 1800).

In some embodiments, the fuel delivery system 1838 is configured to provide a direct injection of fuel into the combustion areas 1840 during operation. In other instances, the fuel delivery system 1838 includes an intake manifold configured to pre-mix a fuel source with air or oxygen before delivering the air-fuel mixture into the combustion areas 1840 to improve combustion efficiency. Further, in some embodiments, the fuel delivery system 1838 is configured to pre-accelerate the fuel or air-fuel mixture to allow for rapid injection of the fuel or air-fuel mixture into the combustion areas 1840 during operation. This rapid injection may additionally pressurize the fuel or air-fuel mixture within the combustion areas 1840, thereby further increasing combustion efficiency.

After the fuel or air-fuel mixture has been delivered into the one or more combustion areas 1840, the corresponding ignition ports 1808 are configured to deliver a spark into the corresponding combustion areas 1840 to ignite the fuel via an ignition system (e.g., similar to the ignition features of the combustion system 910) through corresponding apertures or openings in the outer ring assembly 1802 and the inner ring assembly 1804. When the fuel is ignited, the pressure from the explosion pushes the piston 1826 in the drive direction 1842 within the corresponding combustion chamber 1822.

In front of the piston 1826 (with respect to the drive direction 1842), gas (e.g., air or another inert gas) trapped within a compression area 1844 located between the piston 1826 and a leading combustion chamber wall 1824 (i.e., the combustion chamber wall 1824 that is in front of the piston 1826 with respect to the drive direction 1842) acts as a return mechanism for the piston 1826. That is, as the piston 1826 is forced in the drive direction 1842, the gas trapped within the compression area 1844 compresses and provides a spring-like force that both drives the leading combustion chamber wall 1824 in the drive direction 1842 and also pushes the piston 1826 back toward the trailing combustion chamber wall 1824. In some instances, the inner ring assembly 1804 may further include a locking mechanism (e.g., similar to the locking mechanism 142 described above) to ensure that the piston 1826 is not pushed back into the combustion area 1840 during operation.

After the fuel or air-fuel mixture has been combusted, corresponding exhaust ports 1810 are then configured to pull the exhaust from within the combustion chambers 1822 via an exhaust system (e.g., similar to the exhaust features of the combustion system 910). That is, the exhaust ports 1810 may each have corresponding openings or apertures in the outer ring assembly 1802 and the inner ring assembly 1804 configured to allow the exhaust ports 1810 to pull exhaust out of the combustion chambers 1822 during operation.

In some embodiments, the fuel, ignition, and exhaust processes discussed above may be performed simultaneously (e.g., controlled by a controller similar to the controller 906) within each combustion chamber 1822 of the rotational engine 1800. In some other instances, the fuel, ignition, and exhaust processes discussed above may be performed in alternating arrangements (e.g., controlled by the controller similar to the controller 906) such that only select combustion chambers 1822 (e.g., every other combustion chamber 1822, every third combustion chamber 1822) have combustion processes going on at any given time. In some instances, differing combustion configurations (e.g., combustion happening in all combustion chambers 1822 or combustion happening in alternating combustion chambers 1822) may be used based on the operation speed of the rotational engine 1800.

Furthermore, each of the ignition ports 1808, the exhaust ports 1810, and the fuel ports 1811 may include corresponding moving seals having rubber surrounding portions that push up against the inner ring assembly 1804 from the outer ring assembly 1802 to close off the openings associated with the ignition ports 1808, the exhaust ports 1810, and the fuel ports 1811 in a timed manner during ignition to prevent efficiency losses during the combustion process. For example, the seals may be configured to move into and out of position in a timed manner when the openings or apertures associated with the ignition ports 1808, the exhaust ports 1810, and the fuel ports 1811 are aligned between the inner ring assembly 1804 and the outer ring assembly 1802.

Additionally, in some instances, the timing of the fuel or air-fuel mixture delivery may be configured such that the fuel or air-fuel mixture is injected prior to the piston 1826 returning to its original position within the combustion chamber 1822 such that, as the piston 1826 moves backward within the combustion chamber 1822 (i.e., in the opposite direction of the drive direction 1842), the fuel or air-fuel mixture within the combustion chamber 1822 is further pressurized, thereby increasing the efficiency of the combustion event when the fuel or air-fuel mixture is ignited.

Additionally or alternatively, each combustion chamber 1822 may be include a collapsible portion 1846 configured to partially collapse lengthwise and reverse (e.g., return to an uncollapsed state). Specifically, when a combustion process occurs in the trailing combustion chamber 1822 (e.g., the adjacent combustion chamber 1822 in the opposite direction of the drive direction 1842), the return mechanism (e.g., the pressurized compression area 1844) of the trailing combustion chamber 1822 may provide a force onto the combustion chamber 1822 having the collapsible portion 1846 that is configured to partially collapse the collapsible portion 1846. The collapsible portion 1846 may then return to the uncollapsed state upon a combustion event occurring within the combustion area 1840 of the combustion chamber 1822 having the collapsible portion 1846. In these instances, the timing of the fuel or air-fuel mixture delivery may be configured to inject the fuel or air-fuel mixture prior to the collapsible portion 1846 collapsing such that the fuel or air-fuel mixture is pressurized as the collapsible portion 1846 collapses, thereby further increasing the efficiency of the combustion event when the fuel or air-fuel mixture is ignited.

It should be appreciated that, in some instances, the combustion chambers 1822 may not include the collapsible portion 1846 and/or the timing of the fuel or air-fuel mixture delivery may be configured such that the fuel or air-fuel mixture is injected once the piston 1826 has returned to its original position. That is, regardless of the fuel or air-fuel mixture being further pressurized prior to ignition, the combustion event will still force the piston 1826 in the drive direction 1842.

Further, in some embodiments, the rotational engine 1800 may be configured such that exhaust pulled from the combustion chamber 1822 may be directed into the compression area 1844 (e.g., via an optional separate exhaust diversion port 1848 shown in FIG. 21) to aid the return mechanism (e.g., the gas spring created within the compression area 1844) in returning the piston 1826 to its original position. This may additionally help to prevent a vacuum lock of the piston 1826 from occurring within the combustion chamber 1822 in the instance that any of the gas within the compression area 1844 escapes around the piston 1826.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the constructions and arrangements of the rotational engine systems as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A rotational engine system comprising:
a rotational engine including:
an outer ring enclosure defining a rounded shape;
an inner ring component including:
a drive gear engagement portion configured to couple the inner ring component to an external drive gear such that rotation of the drive gear engagement portion rotationally drives the external drive gear;
a piston disposed within the outer ring enclosure and configured to travel within the outer ring enclosure along a circumference of the rounded shape of the outer ring enclosure to drive rotation of the drive gear engagement portion; and
a combustion chamber configured to travel within the outer ring enclosure along the circumference of the rounded shape of the outer ring enclosure, the combustion chamber including a compression mechanism coupled to a piston wall at a first end and the piston at a second end, wherein the compression mechanism is compressed in response to propulsive energy applied to the piston.

2. The rotational engine system of claim 1, wherein the outer ring enclosure further includes a propulsion aperture extending through an outer wall of the outer ring enclosure, wherein a propulsive system is configured to deliver the propulsive energy into the outer ring enclosure through the propulsion aperture.

3. The rotation engine system of claim 2, wherein the combustion chamber includes a chamber window configured to receive the propulsive energy from the propulsion aperture.

4. The rotational engine system of claim 2, further comprising a controller configured to control operation of the propulsion system, the controller operable to determine an amount of fuel provided to the propulsion system.

5. The rotational engine system of claim 4, wherein the controller is operable to determine when exhaust is pulled from the combustion chamber.

6. The rotational engine system of claim 4, wherein the controller is configured to control a timing of delivery of the propulsive energy such that the propulsive energy is delivered through the propulsion aperture of the outer ring enclosure and into the combustion chamber as the combustion chamber travels along the circumference of the rounded shape of the outer ring enclosure.

7. The rotation engine system of claim 1, wherein the inner ring component includes a plurality of combustion chambers and a plurality of pistons, wherein each combustion chamber includes a respective piston.

8. The rotation engine system of claim 1, wherein the combustion chamber includes a locking mechanism disposed within the combustion chamber operable to restrict a range of motion of the piston.

9. The rotation engine system of claim 8, wherein the locking mechanism includes a pair of opposed protrusions extending radially-inward into the combustion chamber.

10. The rotation engine system of claim 1, wherein the outer ring enclosure further includes an inner ring drive channel comprising an empty space disposed along the circumference of the rounded shape of the outer ring enclosure to enable coupling between the inner ring component and the external drive gear.

11. The rotation engine system of claim 1, wherein the combustion chamber includes a fuel port operable to direct fuel into the combustion chamber from a fuel aperture of the outer ring enclosure.

12. The rotation engine system of claim 1, wherein the combustion chamber includes an ignition port operable to direct an ignition source into the combustion chamber from an ignition aperture of the outer ring enclosure.

13. The rotation engine system of claim 1, wherein the combustion chamber includes an exhaust port operable to direct exhaust out of the combustion chamber from an exhaust aperture of the outer ring enclosure.

14. The rotation engine system of claim 1, wherein the external drive gear includes an inner ring engagement section configured to couple the external drive gear with the drive gear engagement portion.

15. The rotation engine system of claim 1, wherein the combustion chamber includes a trailing wall, wherein the piston is disposed between the trailing wall and the piston wall, wherein combustion occurs between the trailing wall and the piston.

16. The rotation engine system of claim 1, wherein the compression mechanism comprises a compression spring.

* * * * *